(12) United States Patent
Parekh et al.

(10) Patent No.: US 9,155,008 B2
(45) Date of Patent: Oct. 6, 2015

(54) APPARATUS AND METHOD OF PERFORMING A HANDOFF IN A COMMUNICATION NETWORK

(75) Inventors: Nileshkumar J. Parekh, San Diego, CA (US); Maksim (Max) Krasnyanskiy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1455 days.

(21) Appl. No.: 12/055,076

(22) Filed: Mar. 25, 2008

(65) Prior Publication Data

US 2008/0240039 A1     Oct. 2, 2008

Related U.S. Application Data

(60) Provisional application No. 60/908,055, filed on Mar. 26, 2007, provisional application No. 60/908,120, filed on Mar. 26, 2007, provisional application No. 60/908,047, filed on Mar. 26, 2007.

(51) Int. Cl.
*H04W 36/00* (2009.01)
*H04W 36/02* (2009.01)
*H04L 1/18* (2006.01)

(52) U.S. Cl.
CPC ............ *H04W 36/02* (2013.01); *H04L 1/1874* (2013.01)

(58) Field of Classification Search
None
See application file for complete search history.

(56) References Cited

U.S. PATENT DOCUMENTS

| | | |
|---|---|---|
| 4,833,701 A | 5/1989 | Comroe et al. |
| 5,117,502 A | 5/1992 | Onoda et al. |
| 5,128,938 A | 7/1992 | Borras |
| 5,200,952 A | 4/1993 | Bernstein et al. |
| 5,208,837 A | 5/1993 | Richey |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,268,933 A | 12/1993 | Averbuch |
| 5,388,102 A | 2/1995 | Griffith et al. |
| 5,490,139 A | 2/1996 | Baker et al. |
| 5,491,835 A | 2/1996 | Sasuta et al. |

(Continued)

FOREIGN PATENT DOCUMENTS

| | | |
|---|---|---|
| AU | 2002353616 | 5/2003 |
| CL | 36022006 | 6/2007 |

(Continued)

OTHER PUBLICATIONS

International Search Report—PCT/US2008/058328, International Searching Authority—European Patent Office—Oct. 15, 2008.

(Continued)

*Primary Examiner* — Robert C Scheibel
(74) *Attorney, Agent, or Firm* — John J. Ketchum

(57) ABSTRACT

Apparatus and methods enable an efficient, low-latency handoff of a communication session, which may be especially effective in a high data rate network. The apparatus and methods provide for a source transceiver module to complete a transmission in-progress while at the same time informing a target transmission module of an end point of the transmission such that data in a shadow buffer of an anchor network function module can be sent to the target transceiver function prior to implementation of the handoff. As such, the apparatus and methods allow for an extremely quick handoff that minimizes use of a backhaul network.

34 Claims, 8 Drawing Sheets

(56) References Cited

U.S. PATENT DOCUMENTS

| | | |
|---|---|---|
| 5,509,027 A | 4/1996 | Vook et al. |
| 5,539,925 A | 7/1996 | Yli-Kotila et al. |
| 5,561,841 A | 10/1996 | Markus |
| 5,572,528 A | 11/1996 | Shuen |
| 5,574,720 A | 11/1996 | Lee |
| 5,594,943 A | 1/1997 | Balachandran |
| 5,694,548 A | 12/1997 | Baugher et al. |
| 5,722,044 A | 2/1998 | Padovani et al. |
| 5,737,328 A | 4/1998 | Norman et al. |
| 5,794,137 A | 8/1998 | Harte |
| 5,854,785 A | 12/1998 | Willey |
| 5,870,427 A | 2/1999 | Tiedemann, Jr. et al. |
| 5,974,036 A | 10/1999 | Acharya et al. |
| 5,978,366 A | 11/1999 | Massingill et al. |
| 6,016,316 A | 1/2000 | Moura et al. |
| 6,018,521 A | 1/2000 | Timbs et al. |
| 6,031,863 A | 2/2000 | Jusa et al. |
| 6,034,950 A | 3/2000 | Sauer et al. |
| 6,049,543 A | 4/2000 | Sauer et al. |
| 6,055,428 A | 4/2000 | Soliman |
| 6,073,021 A | 6/2000 | Kumar et al. |
| 6,084,969 A | 7/2000 | Wright et al. |
| 6,094,427 A | 7/2000 | Yi |
| 6,097,952 A | 8/2000 | Kawabata |
| 6,101,394 A | 8/2000 | Illidge |
| 6,137,787 A | 10/2000 | Chawla et al. |
| 6,144,671 A | 11/2000 | Perinpanathan et al. |
| 6,151,502 A | 11/2000 | Padovani et al. |
| 6,157,668 A | 12/2000 | Gilhousen et al. |
| 6,157,833 A | 12/2000 | Lawson-Jenkins et al. |
| 6,157,978 A | 12/2000 | Ng et al. |
| 6,161,008 A | 12/2000 | Lee et al. |
| 6,163,692 A | 12/2000 | Chakrabarti et al. |
| 6,195,552 B1 | 2/2001 | Jeong et al. |
| 6,195,705 B1 | 2/2001 | Leung |
| 6,201,971 B1 | 3/2001 | Purnadi et al. |
| 6,256,300 B1 | 7/2001 | Ahmed et al. |
| 6,272,129 B1 | 8/2001 | Dynarski et al. |
| 6,285,665 B1 | 9/2001 | Chuah |
| 6,300,887 B1 | 10/2001 | Le |
| 6,308,267 B1 | 10/2001 | Gremmelmaier |
| 6,345,043 B1 | 2/2002 | Hsu |
| 6,347,091 B1 | 2/2002 | Wallentin et al. |
| 6,360,100 B1 | 3/2002 | Grob et al. |
| 6,366,561 B1 | 4/2002 | Bender |
| 6,370,380 B1 | 4/2002 | Norefors et al. |
| 6,397,065 B1 | 5/2002 | Huusko et al. |
| 6,400,722 B1 | 6/2002 | Chuah et al. |
| 6,445,922 B1 | 9/2002 | Hiller et al. |
| 6,446,127 B1 | 9/2002 | Schuster et al. |
| 6,449,481 B1 | 9/2002 | Kwon et al. |
| 6,456,604 B1 | 9/2002 | Lee et al. |
| 6,466,964 B1 | 10/2002 | Leung et al. |
| 6,473,418 B1 | 10/2002 | Laroia et al. |
| 6,493,725 B1 | 12/2002 | Iwai et al. |
| 6,496,704 B2 | 12/2002 | Yuan |
| 6,510,153 B1 | 1/2003 | Inoue et al. |
| 6,516,352 B1 | 2/2003 | Booth et al. |
| 6,519,457 B1 | 2/2003 | Jiang et al. |
| 6,529,732 B1 | 3/2003 | Vainiomaki et al. |
| 6,535,493 B1 | 3/2003 | Lee et al. |
| 6,553,227 B1 | 4/2003 | Ho et al. |
| 6,587,680 B1 | 7/2003 | Ala-Laurila et al. |
| 6,611,547 B1 | 8/2003 | Rauhala |
| 6,640,248 B1 | 10/2003 | Jorgensen |
| 6,654,363 B1 | 11/2003 | Li et al. |
| 6,671,512 B2 | 12/2003 | Laakso |
| 6,701,155 B2 | 3/2004 | Sarkkinen et al. |
| 6,708,031 B2 | 3/2004 | Purnadi et al. |
| 6,714,524 B1 | 3/2004 | Kim et al. |
| 6,714,777 B1 | 3/2004 | Naqvi et al. |
| 6,714,788 B2 | 3/2004 | Voyer |
| 6,728,365 B1 | 4/2004 | Li et al. |
| 6,754,492 B1 | 6/2004 | Stammers et al. |
| 6,763,007 B1 | 7/2004 | La Porta et al. |
| 6,768,908 B1 | 7/2004 | Jalloul et al. |
| 6,771,962 B2 | 8/2004 | Saifullah et al. |
| 6,785,256 B2 | 8/2004 | O'neill |
| 6,807,421 B1 | 10/2004 | Ahmavaara |
| 6,842,621 B2 | 1/2005 | Labun et al. |
| 6,842,630 B2 | 1/2005 | Periyalwar |
| 6,862,446 B2 | 3/2005 | Oneill et al. |
| 6,901,063 B2 | 5/2005 | Vayanos et al. |
| 6,917,605 B2 | 7/2005 | Kakemizu et al. |
| 6,937,566 B1 | 8/2005 | Forslow |
| 6,947,401 B2 | 9/2005 | El-Malki et al. |
| 6,950,650 B2 | 9/2005 | Roeder |
| 6,954,442 B2 | 10/2005 | Tsirtsis et al. |
| 6,961,579 B2 | 11/2005 | Inukai et al. |
| 6,965,585 B2 | 11/2005 | Grilli et al. |
| 6,970,445 B2 | 11/2005 | Oneill et al. |
| 6,990,088 B2 | 1/2006 | Madour |
| 6,990,337 B2 | 1/2006 | Oneill et al. |
| 6,990,339 B2 | 1/2006 | Turanyi et al. |
| 6,990,343 B2 | 1/2006 | Lefkowitz |
| 6,992,994 B2 | 1/2006 | Das et al. |
| 6,993,332 B2 | 1/2006 | Pedersen et al. |
| 7,003,311 B2 | 2/2006 | Ebata et al. |
| 7,006,826 B2 | 2/2006 | Cao et al. |
| 7,016,317 B1 | 3/2006 | Pathak et al. |
| 7,027,400 B2 | 4/2006 | O'neill |
| 7,027,449 B2 | 4/2006 | Garcia-Luna-Aceves et al. |
| 7,047,009 B2 | 5/2006 | Laroia et al. |
| 7,068,640 B2 | 6/2006 | Kakemizu et al. |
| 7,068,654 B1 | 6/2006 | Joseph et al. |
| 7,069,040 B2 | 6/2006 | Iwanaga et al. |
| 7,089,008 B1 | 8/2006 | Back et al. |
| 7,116,654 B2 | 10/2006 | Kim |
| 7,123,599 B2 | 10/2006 | Yano et al. |
| 7,130,291 B1 | 10/2006 | Kim et al. |
| 7,161,913 B2 | 1/2007 | Jung |
| 7,177,641 B1 | 2/2007 | Miernik et al. |
| 7,184,771 B1 | 2/2007 | Mouly et al. |
| 7,197,318 B2 | 3/2007 | Schwarz et al. |
| 7,233,583 B2 | 6/2007 | Asthana et al. |
| 7,233,794 B2 | 6/2007 | Grob et al. |
| 7,263,357 B2 | 8/2007 | Lee et al. |
| 7,266,100 B2 | 9/2007 | Le et al. |
| 7,272,122 B2 | 9/2007 | Trossen et al. |
| 7,283,495 B2 | 10/2007 | Lee et al. |
| 7,283,511 B2 | 10/2007 | Hans et al. |
| 7,290,063 B2 | 10/2007 | Kalliokulju et al. |
| 7,315,554 B2 | 1/2008 | Baum et al. |
| 7,330,542 B2 | 2/2008 | Kauhanen et al. |
| 7,336,953 B2 | 2/2008 | Kim et al. |
| 7,369,855 B2 | 5/2008 | Oneill et al. |
| 7,369,859 B2 | 5/2008 | Gallagher |
| 7,376,101 B2 | 5/2008 | Shim et al. |
| 7,389,110 B2 | 6/2008 | Lee |
| 7,391,741 B2 | 6/2008 | Kang |
| 7,403,789 B2 | 7/2008 | Takano et al. |
| 7,408,917 B1 | 8/2008 | Kyung et al. |
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | Oneill et al. |
| 7,672,254 B2 | 3/2010 | Kim et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |
| 7,773,947 B2 | 8/2010 | Gerlach |

(56) References Cited

U.S. PATENT DOCUMENTS

| | | |
|---|---|---|
| 7,962,142 B2 | 6/2011 | Oneill et al. |
| 8,112,102 B2 | 2/2012 | Fischer |
| 8,144,664 B2 | 3/2012 | Pani et al. |
| 8,165,587 B2 | 4/2012 | Dahlen et al. |
| 8,184,615 B2 | 5/2012 | Tsirtsis et al. |
| 8,229,120 B2 | 7/2012 | Iwamura et al. |
| 8,583,044 B2 | 11/2013 | Dua |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1* | 6/2002 | Bautz et al. ............... 370/331 |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0114308 A1 | 8/2002 | Takano et al. |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0009582 A1 | 1/2003 | Qiao et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0101307 A1 | 5/2003 | Gemelli et al. |
| 2003/0103496 A1 | 6/2003 | Lakshmi |
| 2003/0104814 A1 | 6/2003 | Gwon et al. |
| 2003/0112766 A1 | 6/2003 | Riedel et al. |
| 2003/0119516 A1 | 6/2003 | Tomishima et al. |
| 2003/0204599 A1 | 10/2003 | Trossen et al. |
| 2003/0210669 A1 | 11/2003 | Vayanos et al. |
| 2003/0212764 A1 | 11/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2003/0236103 A1 | 12/2003 | Tamaki et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0192390 A1 | 9/2004 | Tajima |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0020262 A1 | 1/2005 | Kim |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0090260 A1 | 4/2005 | Semper et al. |
| 2005/0128949 A1 | 6/2005 | Ku et al. |
| 2005/0128990 A1 | 6/2005 | Eom et al. |
| 2005/0141468 A1 | 6/2005 | Kim et al. |
| 2005/0143072 A1 | 6/2005 | Yoon et al. |
| 2005/0201324 A1 | 9/2005 | Zheng |
| 2005/0265303 A1 | 12/2005 | Edwards et al. |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum et al. |
| 2006/0029028 A1 | 2/2006 | Kim et al. |
| 2006/0056348 A1 | 3/2006 | Marinier et al. |
| 2006/0067526 A1 | 3/2006 | Faccin et al. |
| 2006/0069809 A1 | 3/2006 | Serlet |
| 2006/0089141 A1 | 4/2006 | Ho et al. |
| 2006/0099948 A1 | 5/2006 | Hoghooghi et al. |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0183479 A1 | 8/2006 | Liu et al. |
| 2006/0217119 A1 | 9/2006 | Bosch et al. |
| 2006/0230019 A1 | 10/2006 | Hill et al. |
| 2006/0268924 A1 | 11/2006 | Marinier et al. |
| 2006/0285520 A1* | 12/2006 | Venkitaraman ............... 370/331 |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1* | 4/2007 | Kim et al. ............... 370/236 |
| 2007/0099618 A1 | 5/2007 | Kim |
| 2007/0105555 A1 | 5/2007 | Miernik et al. |
| 2007/0105584 A1 | 5/2007 | Grob et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0171875 A1* | 7/2007 | Suda ............... 370/333 |
| 2007/0189282 A1 | 8/2007 | Lohr et al. |
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0019293 A1 | 1/2008 | Chang et al. |
| 2008/0031198 A1* | 2/2008 | Hwang et al. ............... 370/331 |
| 2008/0051091 A1 | 2/2008 | Phan et al. |
| 2008/0074994 A1 | 3/2008 | Jen |
| 2008/0076424 A1 | 3/2008 | Barber et al. |
| 2008/0089287 A1* | 4/2008 | Sagfors et al. ............... 370/331 |
| 2008/0146231 A1 | 6/2008 | Huang et al. |
| 2008/0160999 A1 | 7/2008 | Eklund |
| 2008/0242292 A1 | 10/2008 | Koskela et al. |
| 2008/0253332 A1 | 10/2008 | Ore et al. |
| 2008/0259855 A1 | 10/2008 | Yoon et al. |
| 2008/0261600 A1 | 10/2008 | Somasundaram et al. |
| 2009/0029706 A1 | 1/2009 | Prakash et al. |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1* | 7/2009 | Venkitaraman ............... 370/331 |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2010/0080126 A1 | 4/2010 | Higashida |
| 2011/0019614 A1 | 1/2011 | Oneill et al. |
| 2011/0039546 A1 | 2/2011 | Narasimha et al. |
| 2011/0039552 A1 | 2/2011 | Narasimha et al. |

(56) References Cited

U.S. PATENT DOCUMENTS

| | | | |
|---|---|---|---|
| 2011/0051660 A1 | 3/2011 | Arora et al. |
| 2011/0103347 A1 | 5/2011 | Dimou |
| 2011/0250892 A1 | 10/2011 | Gupta et al. |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |
| 2013/0294324 A1 | 11/2013 | Corson et al. |
| 2015/0030003 A1 | 1/2015 | O'Neill et al. |

FOREIGN PATENT DOCUMENTS

| | | |
|---|---|---|
| CL | 36052006 | 6/2007 |
| CL | 36032006 | 7/2007 |
| CL | 36042006 | 7/2007 |
| CN | 1043052 A | 6/1990 |
| CN | 1133669 A | 10/1996 |
| CN | 1344477 | 4/2002 |
| CN | 1345518 A | 4/2002 |
| CN | 1416284 A | 5/2003 |
| CN | 1481119 A | 3/2004 |
| CN | 1514607 | 7/2004 |
| CN | 1650178 | 8/2005 |
| CN | 1859529 A | 11/2006 |
| EP | 0740440 A2 | 10/1996 |
| EP | 0813346 A1 | 12/1997 |
| EP | 0974895 A2 | 1/2000 |
| EP | 1088463 A1 | 4/2001 |
| EP | 1128704 A1 | 8/2001 |
| EP | 1345370 A2 | 9/2003 |
| EP | 0926608 B1 | 3/2004 |
| EP | 1458209 A2 | 9/2004 |
| EP | 1473872 A2 | 11/2004 |
| EP | 1489808 A2 | 12/2004 |
| EP | 1507421 A1 | 2/2005 |
| EP | 1565024 A2 | 8/2005 |
| EP | 1720267 A1 * | 11/2006 |
| EP | 1764942 A2 * | 3/2007 |
| GB | 2322046 | 8/1998 |
| GB | 2395629 A | 5/2004 |
| JP | 2084807 | 3/1990 |
| JP | 08116329 | 5/1996 |
| JP | 11308273 | 11/1999 |
| JP | H11341541 A | 12/1999 |
| JP | 2000125343 A | 4/2000 |
| JP | 2001217830 A | 8/2001 |
| JP | 2001237878 A | 8/2001 |
| JP | 2001245355 | 9/2001 |
| JP | 2002111732 A | 4/2002 |
| JP | 2002513527 A | 5/2002 |
| JP | 2002165249 A | 6/2002 |
| JP | 2002281069 A | 9/2002 |
| JP | 2002281539 A | 9/2002 |
| JP | 2002534923 T | 10/2002 |
| JP | 2002537739 | 11/2002 |
| JP | 2003060685 A | 2/2003 |
| JP | 2003111134 A | 4/2003 |
| JP | 2003348007 | 5/2003 |
| JP | 2003304571 A | 10/2003 |
| JP | 2003338833 A | 11/2003 |
| JP | 2004007578 A | 1/2004 |
| JP | 2004104544 A | 4/2004 |
| JP | 2004147228 | 5/2004 |
| JP | 2004187256 A | 7/2004 |
| JP | 2004201289 A | 7/2004 |
| JP | 2004297130 A | 10/2004 |
| JP | 2004328637 A | 11/2004 |
| JP | 2005531173 T | 10/2005 |
| JP | 2007513569 | 5/2007 |
| JP | 2007521759 | 8/2007 |
| JP | 2007527177 T | 9/2007 |
| JP | 2008053889 A | 3/2008 |
| JP | 4827994 B1 | 11/2011 |
| KR | 20040004918 A | 1/2004 |
| KR | 20040105069 A | 12/2004 |
| KR | 20050023194 A | 3/2005 |
| KR | 20050065123 | 6/2005 |
| KR | 20050066287 A | 6/2005 |
| KR | 20070031810 A | 3/2007 |
| RU | 2117396 C1 | 8/1998 |
| RU | 2003120063 A | 2/2005 |
| RU | 2256299 C2 | 7/2005 |
| RU | 2005115564 A | 11/2005 |
| RU | 2267864 | 1/2006 |
| RU | 2005120079 A | 2/2006 |
| RU | 2292669 | 1/2007 |
| RU | 2294596 C2 | 2/2007 |
| TW | 200527930 | 8/2005 |
| TW | 200708018 | 2/2007 |
| WO | 9501706 A1 | 1/1995 |
| WO | WO9512297 | 5/1995 |
| WO | 9804094 A1 | 1/1998 |
| WO | WO9833288 | 7/1998 |
| WO | WO9847302 | 10/1998 |
| WO | WO9856140 A2 | 12/1998 |
| WO | WO9905828 A1 | 2/1999 |
| WO | WO9927718 | 6/1999 |
| WO | WO9966748 A1 | 12/1999 |
| WO | WO0018173 | 3/2000 |
| WO | WO0041401 | 7/2000 |
| WO | WO0041426 A1 | 7/2000 |
| WO | WO0128160 A2 | 4/2001 |
| WO | WO0158196 A1 | 8/2001 |
| WO | WO0163947 | 8/2001 |
| WO | WO0178440 | 10/2001 |
| WO | 0219746 A1 | 3/2002 |
| WO | WO0243409 A2 | 5/2002 |
| WO | 0247407 A2 | 6/2002 |
| WO | WO02056551 A1 | 7/2002 |
| WO | WO03007484 A2 | 1/2003 |
| WO | WO030017582 | 2/2003 |
| WO | WO03092316 A1 | 11/2003 |
| WO | WO03098816 A2 | 11/2003 |
| WO | WO03105516 A1 | 12/2003 |
| WO | 2004039022 A2 | 5/2004 |
| WO | WO2004068739 A1 | 8/2004 |
| WO | WO2004070989 | 8/2004 |
| WO | 2004075468 A2 | 9/2004 |
| WO | WO2004079949 A1 | 9/2004 |
| WO | WO2004105272 A1 | 12/2004 |
| WO | WO2004107638 A2 | 12/2004 |
| WO | WO-2004114695 A1 | 12/2004 |
| WO | WO2005029790 | 3/2005 |
| WO | 2005048629 A1 | 5/2005 |
| WO | WO2005062633 | 7/2005 |
| WO | WO-2005078966 A1 | 8/2005 |
| WO | WO2005084146 A2 | 9/2005 |
| WO | WO2005120183 A2 | 12/2005 |
| WO | WO2006002676 A1 | 1/2006 |
| WO | 2006083131 A1 | 8/2006 |
| WO | WO2008113373 A1 | 9/2008 |
| WO | WO-2008131401 A1 | 10/2008 |

OTHER PUBLICATIONS

Written Opinion—PCT/US2008/058328, International Searching Authority—European Patent Office—Oct. 15, 2008.

3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route Des Lucioles, F-06921 Sophia-Antipolis Cedex, France, No. Athens, Greece, Feb. 3, 2009, XP050318707.

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

(56) References Cited

OTHER PUBLICATIONS

Baker, F., IETF, "RSVP Management Information Base Using SMlv2," Network Working Group, Request for Comments: 2206, pp. 1-64 (Sep. 1997).
Berger, L., et al., "RSVP Extensions for IPSEC Data Flows," IETF, Network Working Group, Request for Comments: 2207, pp. 1-14 (Sep. 1997).
Berger, L., "RSVP Refresh Overhead Reduction Extensions," IETF Network Working Group, Request for Comments: 2961, pp. 1-32 (Apr. 2001).
Bos et al., "A Framework for End-to-End Perceived Quality of Service Negotiation", IETF Internal Draft, draft-bos-mmusic-sdpqos-framework-00.txt, Nov. 2001, pp. 1-22.
Braden, R., "Resource ReSerVation Protocol (RSVP)—Ver. 1, Message Processing Rules," IETF, Network Working Group, Request for Comments: 2209, pp. 1-24 (Sep. 1997).
Braden, R., "Resource ReSerVation Protocol (RSVP)-Ver. 1 Functional Specification". IETF, Network Working Group, Request for Comments: 2205, pp. 1-105 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).
Dorot, V., et al., "An Explanatory Dictionary of Modern Computer Terms," 2nd Edition, BHV-Petersburg Publishers, Saint Petersburg, 2001, 'Program Product on p. 339.
Etri, "Source Specific Multicast (SSM) Explicit Multicast (Xcast)" pp. 1-27 (Jun. 28, 2001).
Ho, Michael. "Integration AAA with Mobile IPv4", Internet Draft, pp. 1-59, Apr. 2002.
Johnson, D., et al., IETF Mobile IP Working Group, "Mobility Support in IPv6,"; Feb. 26, 2003 Downloaded from http://www.join.uni-muenster.de on Dec. 29, 2004, p. 1-169.
Karagiannis, Georgios. "Mobile IP: State of the Art Report," Ericsson, No. 3/0362-FCP NB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph—p. 3, left-hand column, paragraph 3 p. 5, right-hand column, last paragraph—p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D. et al.: "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Moy, J., "OSPF Version 2", Network Working Group, Request for Comments: 2328, pp. 1-244 (Apr. 1998).
Nortel: "Forward Hand-Off options", R2-071980, 3GPP TSG-RAN WG2 Meeting #58, Kobe, Japan, May 7-11, 2007, sections 2-3.
Pallini, G P. et al., "Trends in Handover Design" IEEE 34(3), pp. 82-90, Mar. 1, 1996, XP00557380.
Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. Ran WG2, No. Tallinn, Aug. 23, 2006, XP050131764.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Rosenberg J et al:RFAC 3261: "SIP: Session Initiation Protocol" Jun. 1, 2002; Jun. 2002, Jun. 1, 2002, pp. 1-269, XP015009039.
Schulzrinne et al., "Application-Layer Mobility Using SIP", 0-7803-7133 IEEE, pp. 29-36, Jan. 2000.
Taiwan Search Report—TW097110828—TIPO—Sep. 21, 2011.
Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129 to 134.
Thulasi, A., et al., "IPv6 Prefix Delegation Using ICMPv6", Network Working Group, Hewlett-Packard, pp. 1-33, Apr. 2004.
TIA/EIA/IS-707A.8 "Data Service Options for Spread Spectrum Systems: Radio Link Protocol Type 2" pp. 1-1:4:12 (Mar. 1999).
Trossen, D. et al., "A Dynamic Protocol for Candidate Access-Router Discovery", pp. 1-36 Mar. 14, 2003.
Valko, A.G. et al.: "Cellular IP: A New Approach to Internet Host Mobility" Computer Communication Review, Association for Computing Machinery. New York, US vol. 29, No. 1, Jan. 1999, pp. 50-65, XP000823873 ISSN: 0146-4833, p. 56, Line 7-Line13.
Wedlund et al: "Mobility Support Using SIP", Proc. Of ACM/IEEE International Conference on Wireless and Mobile Multimedia (WoWMoM '99), Seattle, Washington, Aug. 1999.
Wroclawski, J., "The Use of RSVP with IETF Integrated Services," IETF, Network Working Group, Request for Comments: 2210, pp. 1-31 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) , 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V9.2.0, Jan. 7, 2010, pp. 1-178, XP050401821, [retrieved on Jan. 7, 2010].
3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre; 650, Route Des Lucioles; F-06921 Sophia-Antipolis Cedex; France, No. V9.1.0, Jan. 7, 2010, pp. 1-221, XP050401822, [retrieved on Jan. 7, 2010].
Droms, R.: "Dynamic Host Configuration Protocol," IETF Standard, RFC 2131, Internet Engineering Task Force, IETF, CH, pp. 1-45, (Mar. 1997) XP015007915.
Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre ; 650, Route Des Lucioles ; F-06921 Sophia-Antipolis Cedex ; France, vol. Ran WG2, No. San Francisco, USA; Feb. 22, 2010, Mar. 4, 2010, XP050422194, 3 pgs. [retrieved on Mar. 4, 2010].
Ian F.A., et al., "Mobility Management in Next-Generation Wireless Systems", Proceedings of the IEEE, IEEE. New York, US, vol. 87, No. 8, Aug. 1, 1999, XP011044241, ISSN: 0018-9219, pp. 1347-1384.

(56) References Cited

OTHER PUBLICATIONS

"Network Layer Protocol," Jul. 13, 2002, chap. 6, URL: http://www2.yamanashi-ken.ac.jp/~itoyo/lecture/network/network06/index06.htm., pp. 1-35.

"Terms for Use in Textbooks and Lectures on Distributed Computing," Feb. 13, 2005, URL: http://web.archive.org/web/20050213090736/http://www.nuis.ac.jp/~nagal/lecture/dce.html.

Zte, et al., "Handover Cause Report for Mobility Robustness Optimization", 3GPP Draft; R3-092982, 3rd Generation Partnership Project (3GPP), Mobile Competence Centre; 650, Route Des Lucioles; F-06921 Sophia-Antipolis Cedex; France, No. Jeju; Nov. 9, 2009, XP050392455, 4 pgs. [retrieved on Nov. 19, 2009].

Basic Knowledge of Communications Term of Switching HUB, URL, http://www.wdic.org/w/WDIC/%E3%82%B9%E3%82%A4%E3%83%83%E3%83%81%E3%83%B3%E3%82%B0HUB.

Mockapetris P., "Domain Names—Implentation and Specification", IETF RFC 1035, Nov. 1987.

3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)," version 0.0.1, Release 8, year 2007, pp. 9.

International Preliminary Report on Patentability—PCT/US2011/031841, The International Bureau of WIPO—Geneva, Switzerland—Oct. 9, 2012.

Qualcomm Europe, T-Mobile, "Network based solutions to inbound mobility in the presence of PCI confusion", 3GPP TSG-RAN WG3 #64, R3-091027, May, 2008, pp. 1-4, Retrieved from the internet: URL: http://www.3gpp.org/ftp/tsg_ran/WG3_lu/TSGR3_64/Docs/R3-091027.zip.

Qualcomm Incorporated, "UE context fetch procedure stage 2", 3GPP TSG-RAN WG3 Meeting #67, R3-100893, Feb. 2010, pp. 1-4, Retrieved from the internet URL: http://www.3gpp.org/ftp/tsg_ran/WG3_lu/TSGR3_67/Docs/R3-100893.zip.

* cited by examiner

US 9,155,008 B2

APPARATUS AND METHOD OF PERFORMING A HANDOFF IN A COMMUNICATION NETWORK

CLAIM OF PRIORITY UNDER 35 U.S.C. §119

The present Application for Patent claims priority to:

Provisional Application No. 60/908,055 entitled "NETWORK CONTROL FUNCTION LAYER 2 HANDOFF LOW LEVEL DESIGN" filed on Mar. 26, 2007, Provisional Application No. 60/908,120 entitled "NETWORK FUNCTION HIGH LEVEL DESIGN" filed on Mar. 26, 2007, and Provisional Application No. 60/908,047 entitled "TRANSCEIVER FUNCTION SOFTWARE HIGH LEVEL DESIGN" filed on Mar. 26, 2007, all of which are assigned to the assignee hereof and hereby expressly incorporated by reference herein.

BACKGROUND

1. Field

The following description relates generally to wireless communications, and more particularly to apparatus and method of performing a session handoff between network entities.

2. Background

Over the last several years, wireless communications technologies have evolved from analog-driven systems to digital systems. Typically in conventional analog systems, the analog signals are relayed on a forward link and a reverse link and require a significant amount of bandwidth to enable signals to be transmitted and received while being associated with suitable quality. As the analog signals are continuous in time and space, no status messages (e.g., messages indicating receipt or non-receipt of data) are generated. In contrast, packet-switched systems allow analog signals to be converted to data packets and transmitted by way of a physical channel between an access terminal and a base station, router, and the like. In addition, digital data can be relayed in its natural form (e.g., text, Internet data, and the like) via employing a packet switched network. As such, digital wireless communication systems are widely deployed to provide various communication services such as telephony, video, data, messaging, broadcasts, and the like.

Due to the increasing usage of wireless communication devices to perform services with increasing data requirements, wireless network bandwidth and data rates are also increasing. As such, wireless access points may accumulate queues of data destined for a wireless device served by the access point. In prior art systems, when a handover of a wireless device communication session was required from one access point to another access point, these data queues were small enough that they could easily be handled without affecting the quality of the connection. In current high data rate networks, however, the queues of data can become quite large if a handoff is not performed quickly. Such large data queues negatively affect latency experienced in an on-going service, and in services such as Voice over IP (VoIP), latency is an important quality of service (QoS) consideration. Additionally, such large queues may require increased usage of the backhaul network to successfully transfer the data, which negatively impacts network costs, as backhaul network usage is expensive.

Thus, in such high data rate systems, an efficient handoff between various entities becomes important when performing a session handoff.

SUMMARY

The following presents a simplified summary in order to provide a basic understanding of the described aspects. This summary is not an extensive overview and is intended to neither identify key or critical elements nor delineate the scope of such aspects. Its purpose is to present some concepts of the described aspects in a simplified form as a prelude to the more detailed description that is presented later.

In an aspect, a method of performing a session handoff in a wireless communication system, comprises: receiving an ordered sequence of data packets from an anchor network function module after establishing a communication session with an access terminal, wherein the communication session is controlled by the anchor network function module, wherein the anchor network function module comprises a shadow buffer operable to store the ordered sequence of data packets; receiving a handoff request from a target transceiver module during a transmission of a segment of the ordered sequence of data packets to the access terminal via the session; identifying a sequence marker corresponding to an end of the segment as being a completion point of the transmission; continuing to complete the transmission through the end of the segment; and transmitting, in parallel with continuing to complete the transmission, a handoff data state of the session to the anchor network function module, wherein the handoff data state comprises an identifier of the target transceiver module and the sequence marker, wherein the handoff data state is operable to trigger the anchor network function module to transmit a portion of the ordered sequence of data packets to the identified target transceiver module from the shadow buffer, wherein the portion begins after the end of the segment identified by the sequence marker.

In another aspect, at least one processor operable to perform a session handoff in a wireless communication system, comprises: a first module for receiving an ordered sequence of data packets from an anchor network function module after establishing a communication session with an access terminal, wherein the communication session is controlled by the anchor network function module, wherein the anchor network function module comprises a shadow buffer operable to store the ordered sequence of data packets; a second module for receiving a handoff request from a target transceiver module during a transmission of a segment of the ordered sequence of data packets to the access terminal via the session; a third module for identifying a sequence marker corresponding to an end of the segment as being a completion point of the transmission; a fourth module for continuing to complete the transmission through the end of the segment; and a fifth module for transmitting, in parallel with continuing to complete the transmission, a handoff data state of the session to the anchor network function module, wherein the handoff data state comprises an identifier of the target transceiver module and the sequence marker, wherein the handoff data state is operable to trigger the anchor network function module to transmit a portion of the ordered sequence of data packets to the identified target transceiver module from the shadow buffer, wherein the portion begins after the end of the segment identified by the sequence marker.

In an further aspect, a computer program product for performing a session handoff in a wireless communication system, comprises: a computer readable medium, comprising: at least one instruction for causing a computer to receive an ordered sequence of data packets from an anchor network function module after establishing a communication session with an access terminal, wherein the communication session is controlled by the anchor network function module, wherein the anchor network function module comprises a shadow buffer operable to store the ordered sequence of data packets; at least one instruction for causing the computer to receive a handoff request from a target transceiver module during a transmission of a segment of the ordered sequence of data packets to the access terminal via the session; at least one instruction for causing the computer to identify a sequence marker corresponding to an end of the segment as being a completion point of the transmission; at least one instruction for causing the computer to continue to complete the transmission through the end of the segment; and at least one instruction for causing the computer to transmit, in parallel with continuing to complete the transmission, a handoff data state of the session to the anchor network function module, wherein the handoff data state comprises an identifier of the target transceiver module and the sequence marker, wherein the handoff data state is operable to trigger the anchor network function module to transmit a portion of the ordered sequence of data packets to the identified target transceiver module from the shadow buffer, wherein the portion begins after the end of the segment identified by the sequence marker.

In yet another aspect, an access point comprises: means for receiving an ordered sequence of data packets from an anchor network function module after establishing a communication session with an access terminal, wherein the communication session is controlled by the anchor network function module, wherein the anchor network function module comprises a shadow buffer operable to store the ordered sequence of data packets; means for receiving a handoff request from a target transceiver module during a transmission of a segment of the ordered sequence of data packets to the access terminal via the session; means for identifying a sequence marker corresponding to an end of the segment as being a completion point of the transmission; means for continuing to complete the transmission through the end of the segment; and means for transmitting, in parallel with continuing to complete the transmission, a handoff data state of the session to the anchor network function module, wherein the handoff data state comprises an identifier of the target transceiver module and the sequence marker, wherein the handoff data state is operable to trigger the anchor network function module to transmit a portion of the ordered sequence of data packets to the identified target transceiver module from the shadow buffer, wherein the portion begins after the end of the segment identified by the sequence marker.

In a further aspect, an access point comprises: a memory comprising a handoff manager module having sequence determination logic; a processor in communication with the memory and operable to execute the handoff manager module; a source transceiver module operable to receive an ordered sequence of data packets from an anchor network function module after establishing a communication session with an access terminal, wherein the communication session is controlled by the anchor network function module, wherein the anchor network function module comprises a shadow buffer operable to store the ordered sequence of data packets; wherein the source transceiver module operable is operable to receive a handoff request from a target transceiver module during a transmission of a segment of the ordered sequence of data packets to the access terminal via the session; wherein the sequence determination logic is operable to identify a sequence marker corresponding to an end of the segment as being a completion point of the transmission; wherein the source transceiver module is operable to continue to complete the transmission through the end of the segment; and wherein the source transceiver module is operable to continue to transmit, in parallel with continuing to complete the transmission, a handoff data state of the session to the anchor network function module, wherein the handoff data state comprises an identifier of the target transceiver module and the sequence marker, wherein the handoff data state is operable to trigger the anchor network function module to transmit a portion of the ordered sequence of data packets to the identified target transceiver module from the shadow buffer, wherein the portion begins after the end of the segment identified by the sequence marker.

In still another aspect, a method of performing a session handoff in a wireless communication system, comprises: determining that conditions exist for requesting a handoff of an established communication session from the source transceiver module to a target transceiver module, wherein the determining occurs during a receiving of a segment of an ordered sequence of data packets from a source transceiver module; transmitting a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment; receiving a last transmission corresponding to the segment from the source transceiver module; establishing the communication session with the target transceiver function after receiving the last transmission from the source transceiver module; and receiving the portion of the ordered sequence of data packets from the target transceiver function, under a control of the anchor network function module, from the queue without substantial latency after establishing the communication session with the target transceiver function.

In a further aspect, at least one processor for performing a session handoff in a wireless communication system, comprises: a first module for determining that conditions exist for requesting a handoff of an established communication session from the source transceiver module to a target transceiver module, wherein the determining occurs during a receiving of a segment of an ordered sequence of data packets from a source transceiver module; a second module for transmitting a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment; a third module for receiving a last transmission corresponding to the segment from the source transceiver module; a fourth module for establishing the communication session with the target transceiver function after receiving the last transmission from the source transceiver module; and wherein the third module further receives the portion of the ordered sequence of data packets from the target transceiver function, under a control of the anchor network function module, from the queue without substantial latency after establishing the communication session with the target transceiver function.

In another aspect, a computer program product for performing a session handoff in a wireless communication system comprises: a computer readable medium, comprising: at least one instruction for causing a computer to determine that conditions exist for requesting a handoff of an established communication session from the source transceiver module to a target transceiver module, wherein the determining occurs during a receiving of a segment of an ordered sequence of data packets from a source transceiver module; at least one instruction for causing the computer to transmit a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment; at least one instruction for causing the computer to receive a last transmission corresponding to the segment from the source transceiver module; at least one instruction for causing the computer to establish the communication session with the target transceiver function after receiving the last transmission from the source transceiver module; and at least one instruction for causing the computer to receive the portion of the ordered sequence of data packets from the target transceiver function, under a control of the anchor network function module, from the queue without substantial latency after establishing the communication session with the target transceiver function.

In a further aspect, an access terminal comprises: means for determining that conditions exist for requesting a handoff of an established communication session from the source transceiver module to a target transceiver module, wherein the determining occurs during a receiving of a segment of an ordered sequence of data packets from a source transceiver module; means for transmitting a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment; means for receiving a last transmission corresponding to the segment from the source transceiver module; means for establishing the communication session with the target transceiver function after receiving the last transmission from the source transceiver module; and means for receiving the portion of the ordered sequence of data packets from the target transceiver function, under a control of the anchor network function module, from the queue without substantial latency after establishing the communication session with the target transceiver function.

In still another aspect, an access terminal comprises: a memory comprising a handoff manager module having handoff determination logic and handoff requester logic; a processor in communication with the memory and operable to execute the handoff manager module; wherein the handoff determination logic is operable to determine that conditions exist for requesting a handoff of an established communication session from the source transceiver module to a target transceiver module, wherein the determining occurs during a receiving of a segment of an ordered sequence of data packets from a source transceiver module; wherein the handoff requester logic is operable to transmit a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment; a communications module in communication with memory and the processor and operable to receive a last transmission corresponding to the segment from the source transceiver module; wherein the handoff manager module is operable to establish the communication session with the target transceiver function after receiving the last transmission from the source transceiver module; and wherein the communications module is further operable to receive the portion of the ordered sequence of data packets from the target transceiver function, under a control of the anchor network function module, from the queue without substantial latency after establishing the communication session with the target transceiver function.

An additional aspect includes a method of performing a session handoff by a network-side system of a wireless communication system, comprising: controlling a communication session of an access terminal with a source transceiver module; transmitting to the source transceiver module an ordered sequence of data packets destined for the access terminal; copying the ordered sequence of data packets into a shadow buffer operable to store the ordered sequence of data packets; receiving, by the source transceiver module, a handoff request from a target transceiver module during a transmission of a segment of the ordered sequence of data packets to the access terminal via the session; identifying, by the source transceiver module, a sequence marker corresponding to an end of the segment as being a completion point of the transmission; continuing to complete the transmission, by the source transceiver module, through the end of the segment; transmitting, in parallel with continuing to complete the transmission, by the source transceiver module, a handoff data state of the session to the anchor network function module, wherein the handoff data state comprises an identifier of the target transceiver module and the sequence marker; transmitting, by the anchor network function module and in response to receiving the handoff data state, a portion of the ordered sequence of data packets to the identified target transceiver module from the shadow buffer, wherein the portion begins after the end of the segment identified by the sequence marker; and receiving, by the anchor network function module from the source transceiver module, packet data originating from the access terminal during the transmitting of the portion of the ordered sequence of data packets.

A further aspect includes a system for performing a session handoff of a wireless communication system, comprising: an anchor network function module having a corresponding shadow buffer, wherein the anchor network function module is operable to control a communication session of an access terminal with a source transceiver module, wherein the anchor network function module is operable to transmitting to the source transceiver module an ordered sequence of data packets destined for the access terminal, wherein the anchor network function module is further operable to copy the ordered sequence of data packets into the shadow buffer, which is operable to store the ordered sequence of data packets; wherein the source transceiver module is operable to receive a handoff request from a target transceiver module during a transmission of a segment of the ordered sequence of data packets to the access terminal via the session, wherein the source transceiver module is operable to identify a sequence marker corresponding to an end of the segment as being a completion point of the transmission, wherein the source transceiver module is operable to continue to complete the transmission, by the source transceiver module, through the end of the segment; wherein the source transceiver module is operable to transmit, in parallel with continuing to complete the transmission, a handoff data state of the session to the anchor network function module, wherein the handoff data state comprises an identifier of the target transceiver module and the sequence marker; wherein the anchor network function module, in response to receiving the handoff data state, is operable to transmit a portion of the ordered sequence of data packets to the identified target transceiver module from the shadow buffer, wherein the portion begins after the end of the segment identified by the sequence marker; and wherein the anchor network function module is operable to receive, from the source transceiver module, packet data originating from the access terminal during the transmitting of the portion of the ordered sequence of data packets.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings

DETAILED DESCRIPTION

Figure 1:
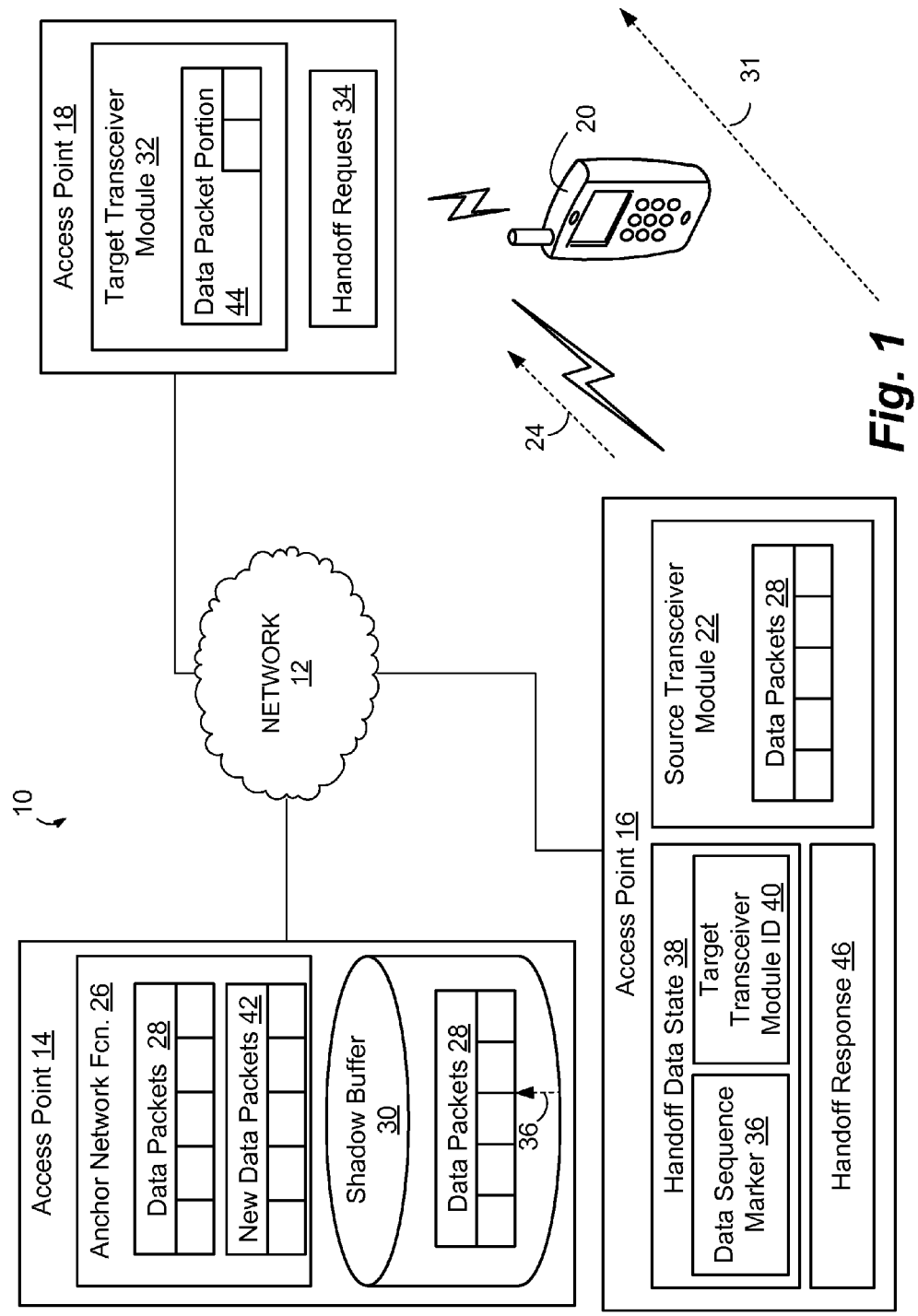
FIG. 1 is a schematic diagram of one aspect of an efficient handoff system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, enhanced Base Station (eBS), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, in one aspect, a system 10 for performing an efficient handoff in a high data rate network 12 includes a plurality of access points 14, 16, 18 potentially operable to communicatively couple an access terminal 20 to network 12. In particular, access point 16 includes a source transceiver module 22 having an established wireless communication session 24 with access terminal 20. Additionally, access point 16 is in network communication with access point 14, which includes an anchor network function module 26 that controls communication session 24. In particular, anchor network function module 26 manages establishment and transition of communication session 24, and further acts as the interface between network 12 and any access point having communication session 24 with access terminal 20. In this case, for example, anchor network function module 26 receives and orders data packets from network 12 and then transmits the resulting sequence of ordered data packets 28 to source transceiver module 22 for communication to access terminal 20. Additionally, access point 14 includes a shadow buffer 30, such as a fixed size, circulating memory (e.g. first in, first out) that stores a copy of the sequence of ordered data packets 28 sent to source transceiver module 22.

Since access terminal 20 is mobile within system 10, access terminal 20 may move to a position where access terminal 20 experiences conditions that trigger a handoff of communication session 24 to another access point. For example, access terminal 20 is continually monitoring pilot signal strength of nearby access points, and may choose to switch access points based on a comparison of pilot signal strengths. For example, access terminal 20 moving in direction 31 toward access point 18 may eventually reach such a position, thereby triggering target transceiver module 32 of access point 18 to transmit a handoff request 34 to source transceiver module 22 of access point 16.

When source transceiver module 22 receives handoff request 34 during a transmission of a segment of the sequence of ordered data packets 28, system 10 provides for a number of actions to occur to insure a relatively quick and efficient handoff that minimizes latency experienced in the on-going transmission. In particular, system 10 allows source transceiver module 22 to complete the on-going transmission of the segment of the sequence of ordered data packets 28 while simultaneously, or in-parallel, informing target transceiver module 32 of the end of the on-going transmission to be completed by source transceiver module 22 and, in some aspects, further arranging simultaneously, or in-parallel, for new ordered data packets following the sequence of ordered data packets 28 to be directed to target transceiver module 32 for delivery to access terminal 20 after the handoff.

In particular, upon receiving handoff request 34, source transceiver module 22 performs the following actions substantially simultaneously or substantially in parallel: identifies a sequence marker 36 corresponding to an end of the segment currently being transmitted as being a completion point of the transmission; continues to complete the on-going transmission through the end of the segment; generates a handoff state data message 38 that defines a state of the session, including sequence marker 36 and a target transceiver module identity 40; and transmits, in parallel with continuing to complete the transmission of the segment, handoff data state message 38 to anchor network function module 26.

Upon receiving handoff data state message 38, anchor network function module 26 immediately switches transmissions of any new data packets 42 following the sequence of ordered data packets 28 to be sent to the identified target transceiver module 32. Further, based on data sequence marker 36, anchor network function module 26 is able to identify the end of the last segment transmitted by source transceiver module 22 in the copy of the sequence of data packets 28 stored in shadow buffer 30, and then sends the remaining data packet portion 44 to the identified target transceiver module 32. Thus, target transceiver module 32 is pre-loaded with data packets for communication session 24 prior to the actual handoff of communication session 24.

Further, upon completing the transmission of the segment, thereby having transmitted the sequence of ordered data packets 28 up to sequence marker 36, source transceiver module 22 transmits a handoff response 46 to target transceiver module 32 to formally complete the handoff of communication session 24, thereby saving half the round trip time on the backhaul network 3. For example, handoff response 46 may include session state information, such as but not limited to one or more link states, a retransmission buffer state, and a control buffer state. At this time, anchor network function module 26 confirms to both transceiver modules that target transceiver module 32 is now serving access terminal 20, and anchor network function module 26 continues to control communications even though handoff has occurred.

Additionally, in another aspect, if target transceiver module 32 is notified by access terminal 20 or discovers based on a retransmission buffer in handoff response 46 that a packet or segment sent by source transceiver function module 32 has not been received, then target transceiver function module 32 does not have to contact source transceiver module 22 and obtain it from a transmit buffer therein. Instead, target transceiver module 32 can save backhaul network usage by obtaining the missing data packet or segment from shadow buffer 30 based on the corresponding sequence marker of the missing data packet or segment.

As such, the described architecture contemplates multiple possible layer 2 handoffs from one transceiver module to another transceiver module, corresponding to transceivers at different locations, without having to implement a layer 3 handoff from one network function module to another network function module until access terminal 20 has moved a relatively large distance or has entered a mobile/dormant state during which a layer 3 handoff can be implemented during a period where data communication is not occurring.

There are various advantages to this approach. For example, one advantage is that it is not necessary to remember which transceiver module or modules were serving previously. Instead, this approach allows for retrieval of unsent and retransmission data packets from the network function module. Further, since the network function module includes shadow buffer for buffering ordered data packets sent to the serving transceiver module, this approach allows network function module to be instructed to send any new data to the new transceiver module immediately upon the initiation of a handoff and before its completion, all while the old transceiver module is finishing transmissions with the access terminal. For example, the on-going transmission of the segment of the sequence of ordered data packets may be a progressive transmission that accounts for error correction by allowing for retransmissions. By preparing in advance for the handoff, when the handoff actually occurs, the new transceiver module already has data to transmit over the forward link to the access terminal.

Additionally, in some aspects, sequence marker 36 may be a byte-based sequence marker as opposed to a packet-based sequence marker. Advantageously, a byte-based sequence marker 36 enables tracking of partial data packets, thereby minimizing or eliminating even partial packet loss.

Further, it has been found that the present apparatus and methods provide for handoffs to occur in a time period of about 20 milliseconds to about 60 milliseconds in some aspects, in a time period of about 40 milliseconds to about 80 milliseconds in another aspect, and less than 100 milliseconds in yet another aspect.

Figure 2:
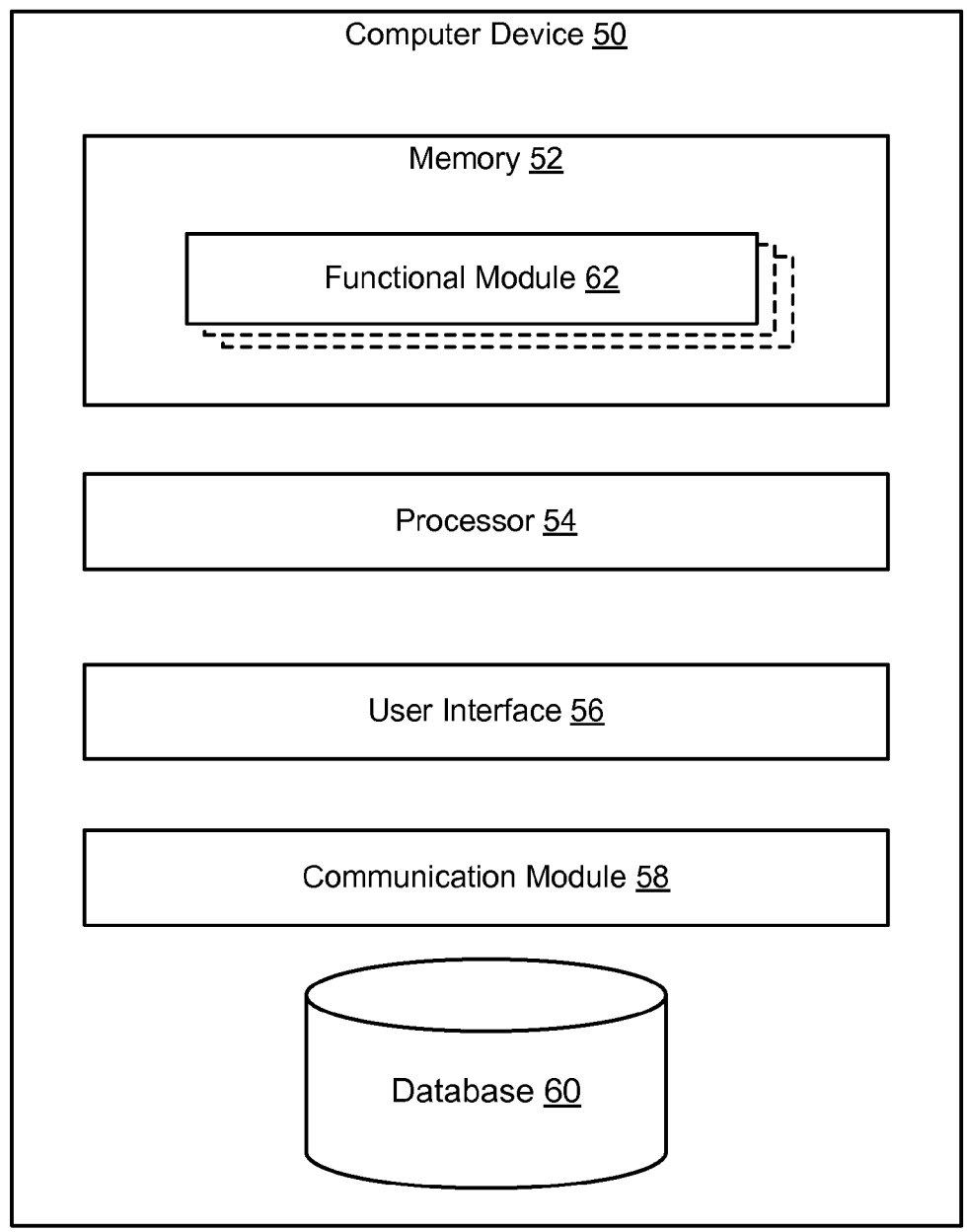
FIG. 2 is a schematic diagram of one aspect of a computer device implementation of one or more of the components of FIG. 1.

Referring to FIG. 2, the components of system 10 (FIG. 1) may be embodied in a computer device 50 that includes a memory 52 in communication with a processor 54. Memory 52 is operable for storing applications for execution by processor 54. Memory 52 can include random access memory (RAM), read only memory (ROM), and a combination thereof. In particular, each component of system 10 (FIG. 1) may include one or more functional modules, applications, or programs 62 operable to perform the component-specific actions described herein. Further, processor 54 is operable for carrying out processing functions associated with one or more of the components described herein. Processor 54 can include a single processor or multiple sets of processors or multi-core processors. Moreover, processor 54 can be implemented as an integrated processing system and/or a distributed processing system.

Additionally, computer device 50 includes user interface 56 operable to receive inputs from a user of access terminal 20, and to generate outputs for presentation to the user. User interface 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 56 may include one or more output devices, including but not limited to a display, a speaker, a haptic feedback mechanism, a printer, any other mechanism capable of presenting an output to a user, or any combination thereof.

Further, computer device 50 includes a communications component 58 that provides for establishing and maintaining communications with one or more other components utilizing hardware, software, and services. Communications component 58 may carry communications between components on computer device 50, as well as between computer device 50 and external devices, such as access points 14, 16 18 (FIG. 1), other network-side or infrastructure elements, or other devices serially or locally connected to computer device 50. Communications component 58 includes a receiver to receive communications and a transmitter to transmit communications. Further, communications component 58 includes the corresponding receive chain components and transmit chain components to enable exchanging messages according to one or more respective protocols.

Additionally, computer device 50 may further include database 60, which can be any suitable combination of hardware and/or software, that provides for mass storage of data/information, data relationships, and software programs/applications employed in connection with aspects described herein when not in use in active memory 52. Additionally, database 60 may store one or more functional modules/programs/applications 62 when the respective applications are not in active memory 50.

Figure 3:
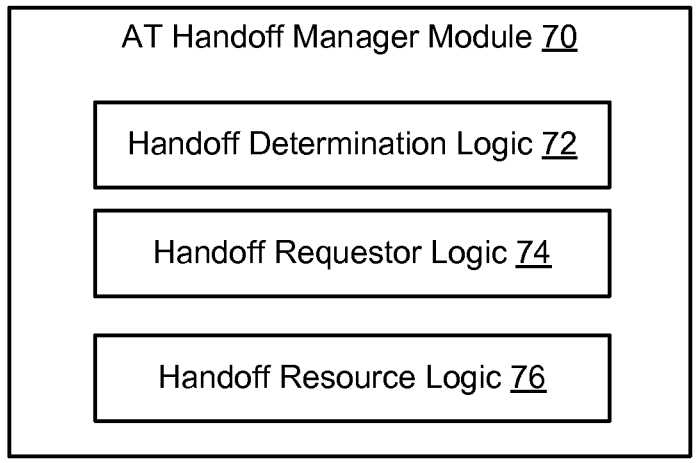
FIG. 3 is a schematic diagram of one aspect of a functional module of the access terminal of FIG. 1.

Referring to FIG. 3, in one aspect of access terminal 20, the functional programs 62 (FIG. 2) may include an access terminal (AT) handoff manager module 70 that includes logic, executable instructions, etc. to perform the handoff-related functionality described herein. In particular, AT handoff manager module 70 may include handoff determination logic 72 to evaluate signal strength of various access points and determine when conditions exist for a handoff. Further, AT handoff manage module 70 may include handoff requester logic 74 responsive to an output of determination logic 72 to notify target transceiver module 32 that a handoff is requested. Additionally, AT handoff manage module 70 may include handoff resource logic 76 to manage and coordinate the resourcing of the handoff of the communication session.

Figure 4:
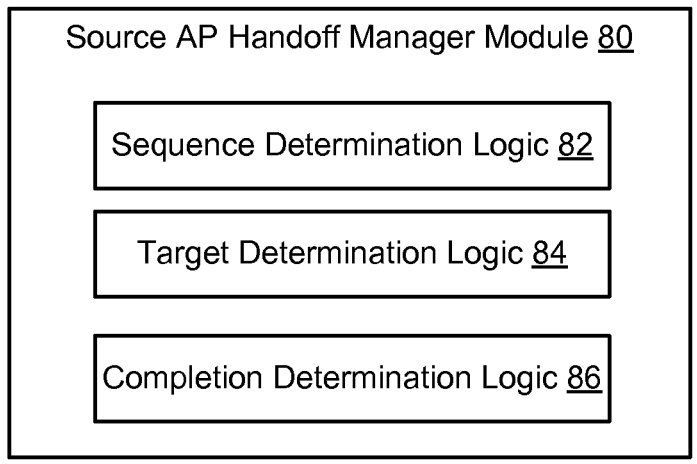
FIG. 4 is a schematic diagram of one aspect of a functional module of a source access point of FIG. 1.

Referring to FIG. 4, in one aspect of access point 16, the functional programs 62 (FIG. 2) may include a source access point (AP) handoff manager module 80 that includes logic, executable instructions, etc. to perform the handoff-related functionality described herein. In particular, source AP handoff manager module 80 may include sequence determination logic 82 operable to evaluate an on-going transmission and find the end point of the transmission to define as sequence marker 36 (FIG. 1). Further, source AP handoff manage module 80 may include target determination logic 84 to parse handoff request 34 and determine target transceiver module identifier 40. Additionally, source AP handoff manage module 80 may include completion determination logic 86 to determine when a handoff is complete. Further, source AP handoff manage module 80 is operable to generate and initiate transmission of handoff data state message 38 and handoff response message 46.

Figure 5:
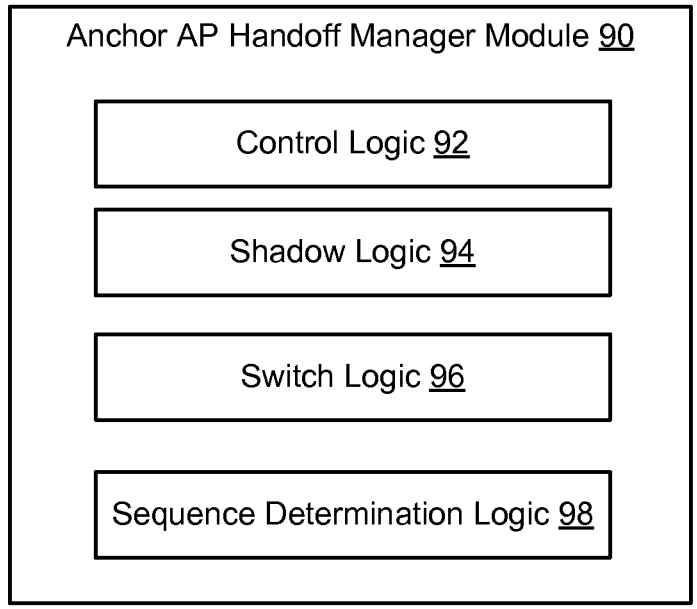
FIG. 5 is a schematic diagram of one aspect of a functional module of an anchor access point of FIG. 1.

Referring to FIG. 5, in one aspect of access point 14, the functional programs 62 (FIG. 2) may include an anchor AP handoff manager module 90 that includes logic, executable instructions, etc. to perform the handoff-related functionality described herein. In particular, anchor AP handoff manager module 90 may include control logic 92 to manage the routing of forward link and reverse link communications between network 12 (FIG. 1) and one or more other access points holding communications sessions with one or more access terminals. Further, anchor AP handoff manage module 90 may include shadow logic 94 to control the operation of shadow buffer 30 (FIG. 1) and retrieve data packets there from. Additionally, anchor AP handoff manage module 90 may include switch logic 96 to manage changing session control from one transceiver module to another transceiver module, including managing the exchange of state information including buffers. Further, anchor AP handoff manage module 90 may include sequence determination logic 98 that operates in response to requests to obtain data from shadow buffer 30, including being responsive to handoff data state message 38 as well as requests for misplaced data packets.

Figure 6:
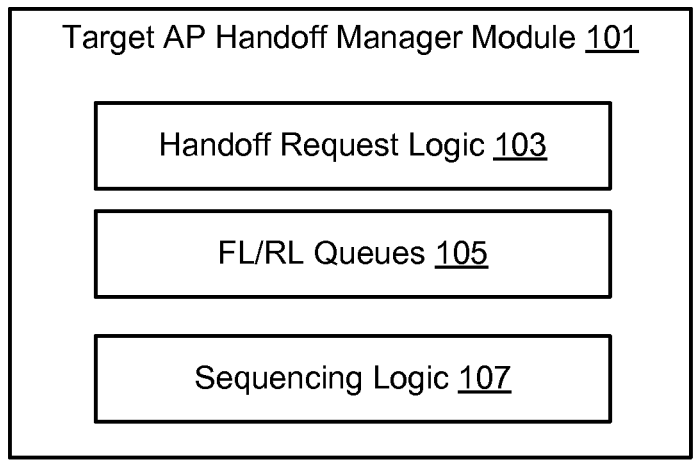
FIG. 6 is a schematic diagram of one aspect of a functional module of a target access point of FIG. 1.

Referring to FIG. 6, in one aspect of access point 18, the functional programs 62 (FIG. 2) may include a target AP handoff manager module 101 that includes logic, executable instructions, etc. to perform the handoff-related functionality described herein. In particular, target AP handoff manager module 90 may include handoff request logic 103 responsive to receiving a request for handoff from an access terminal to generate and transmit handoff request message 34. Additionally, target AP handoff manager module 90 may include forward link (FL) and/or reverse link (RL) queues 105 operable to queue data packets terminated at or originated from a respective access terminal with which target AP handoff manager module 90 may be serving or may be about to serve based on handoff preparation activities. Further, target AP handoff manager module 90 may include sequencing logic 107 to determine how to sequence data held within queues or data received in preparation of a handoff, such as data packet portion 44, and/or misplaced data, such as may be discovered upon receiving source transceiver module state information upon completion of a handoff.

Figure 7:
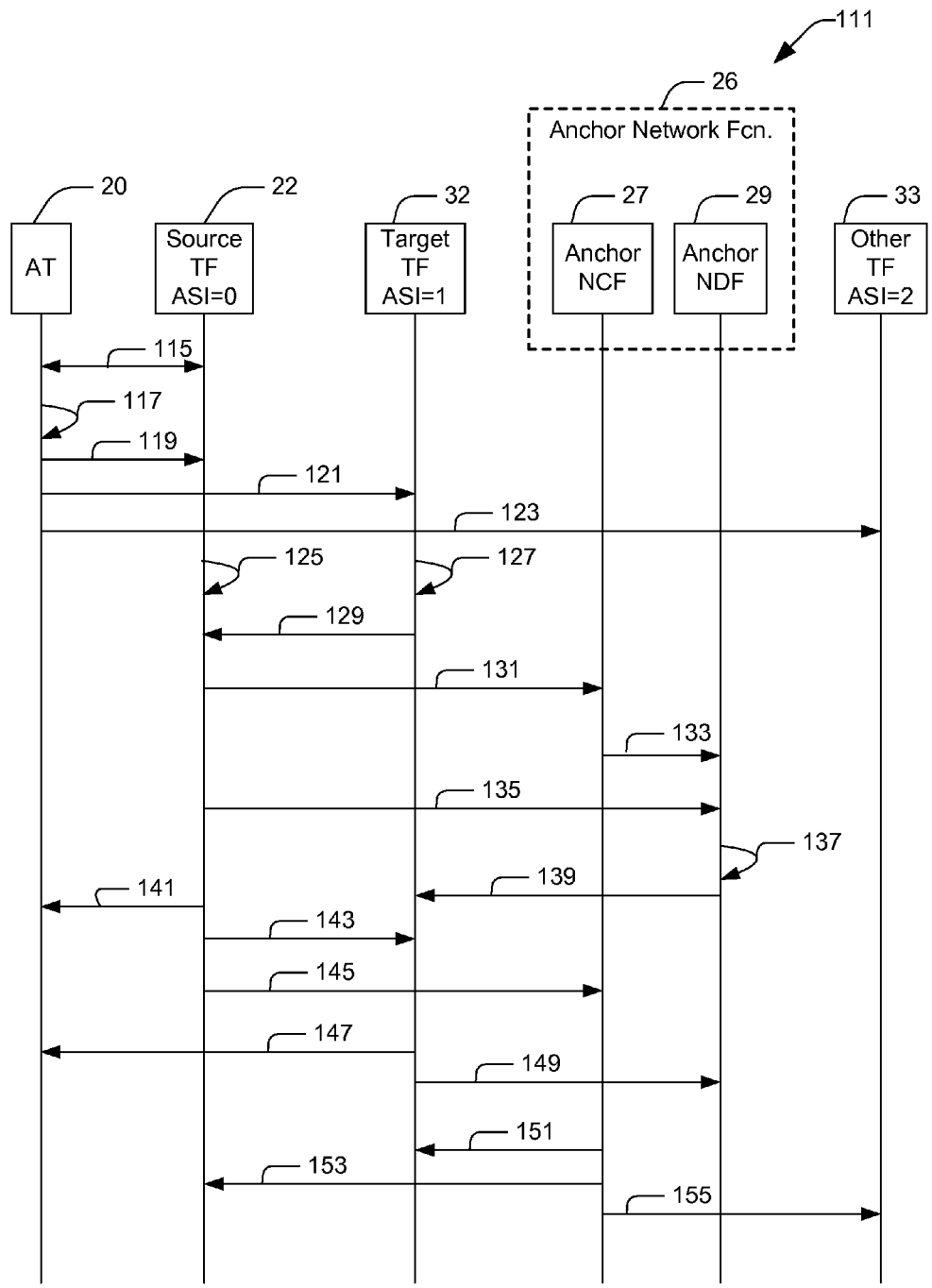
FIG. 7 is a call flow diagram of an aspect of a call flow of the system of FIG. 1.

Referring to FIG. 7, in one non-limiting aspect, a call flow 111 details interactions between various components of a high data rate network, such as system 10 (FIG. 1). In this example, access terminal (AT) 20 has source TF 22, target TF 32 and other TF 33 as potential transceiver modules with which AT 20 may communicate, otherwise referred to as an "active set." Each transceiver module in the active set receives a unique active set index number, so TF 22 is assigned "0" and TF 32 is assigned "1" and TF 33 is assigned "2" in this example. In any case, at act 115, source TF 22 is maintains a communication session with AT 20, which may also be referred to as maintaining a serving sector, as each TF may serve a different sector. At act 117, AT 20 detects conditions that trigger a handoff, such as a weakening in the pilot signal strength of source TF 22 and/or a strengthening of the pilot signal strength of target TF 32. AT 20 identifies the sector (member of active set) to which it would like to be handed off, and at acts 119, 121 and 123 sends a change control request that identifies the desired serving sector to all transceiver modules in the active set to effect a handoff. At acts 125 and 127, source TF 22 and target TF 32 detect that they are the TFs involved in the desired handoff. In response thereto, at act 129, target TF 32 sends a handoff request to source TF 22. In response thereto, at act 131, source TF 22 sends a handoff data state message to network function module 26, or more specifically to a control module portion thereof, referred to as an anchor network control function 27. As discussed above, the handoff data state message identifies target TF 32 as the TF to receive the session, as well as the sequence marker identifying where source TF 22 will stop transmitting data.

At this point it should be noted that in some aspects, such as in an Ultra Mobile Broadband (UMB) implementation, an access point may be divided into distinct entities, namely: a network control function (NCF); a network data function (NDF); and a transceiver function (TF). In general, the NCF can initiate session and connection layer signaling protocols, for example, to transfer control of a session from one TF to another TF. For example, such activities can include: managing system access from the access terminal (AT); providing session discovery/creation/termination functions, allocating/reclaiming dedicated resources for a connection, and the like. As noted above, the transceiver function (TF) can further represent a sector that performs functionality related to the Medium Access Control (MAC) layer (e.g., to provide an air interface attachment point for access terminals in its sector). Further, the network data function (NDF) can implement data processing function to relay data between the network and the transceiver function that serves an access terminal. Furthermore, an ability of NDF to route data packets can be controlled by the NCF, which designates a relation between terminals and the transceiver functions in conjunction with associated handoffs. Accordingly, for forward link traffic from the network to the access terminal, the NDF can manage the shadow buffer and apply a Virtual Radio Link Protocol (VRLP) sequencing, etc., and perform corresponding functionality on reverse link traffic from the access terminal to the network.

Returning to the call flow, after receiving the handoff data state message at act 131, anchor NCF 27 is operable to generate and transmit a handoff switch command to NDF 29, at act 133. The handoff switch command identifies the AT, the target TF, a corresponding MAC identifier, and the sequence marker from the handoff data state message. At act 135, anchor NCF 27 maintains the reverse link connection from AT 20 through source TF 22 and to anchor NDF 29 until completion of the handoff, while at acts 137 and 139, anchor NCF 27 immediately directs any forward link data packets after the sequence marker to be sent to target TF 32, where they will be queued for delivery to AT 20 after the handoff. At act 141, source TF 22 completes the transmission. In one aspect, for example, the completion includes performing the last error correction retransmission, such as a last hybrid Automatic Repeat-reQuest (HARQ) transmission corresponding to the last data segment source TF 22 indicated that it would send. Correspondingly, at act 145, source TF 22 sends a handoff response message to target TF 32 to confirm the handoff. The handoff response message may include the final state information, including one or more of final information on which sequences were transmitted, information relating to retransmission buffers, information relating to control buffers, and information relating to reverse link buffer levels.

Additionally, exemplary states for transfer can include: a data state, a connection state, a session state, and the like. The data state can refer to the state in an access network in the data path between the access terminal and the network data function during a connection and/or handoff transfer. Such data state can further include items such as header compressor state or radio link protocol buffer states, which are typically dynamic in nature. Likewise, the connection state can designate a state in the access network on the control path between the access terminal and the NCF that is not preserved when a connection closes and the access terminal remains idle. The connection state can further include such information as the set of air interface resources reserved for the access terminal, power control loop values, active set information, and the like.

As such, target TF 32 now has all the information it needs to pick up where source TF 22 left off with respect to the communication session. Also, after sending the handoff response, at act 145, source TF 22 confirms the handoff with anchor NCF 27 by sending a handoff transfer message that includes target TF 32 and the target TF active set index. In the meantime, at act 147, target TF 32 sends one or more resource messages to establish communications with AT 20 and take control of the session. After receiving the handoff transfer message from source TF 22, at acts 151, 153 and 155, NCF 27 sends a handoff complete message to all TFs in the active set, where the handoff complete message identifies the serving TF, i.e. target TF 32. Thus, call flow 111 defines a level 2 handoff detection and switch that operates efficiently to reduce latency for a high data rate network. For example, in one aspect, call flow 11 may reduce latency in networks, such as a high speed data system (HSDS) network, having a data rate of greater than about 1 Mbits/second, or in another aspect greater than about 5 Mbits/second, while in other aspects in the range of about 10 Mbits/second to about 150 Mbits/second. Further, the architecture of call flow 111 places the RLP functionality close to AT 20, in order to further reduce latency, as opposed to having the RLP functionality deep within the network.

Methods of operation of system are discussed below. While an exemplary method is illustrated and described herein as a series of blocks representative of various events and/or acts, the subject aspect is not limited by the illustrated ordering of such blocks. For instance, some acts or events may occur in different orders and/or concurrently with other acts or events, apart from the ordering illustrated herein, in accordance with the described aspects. In addition, not all illustrated blocks, events or acts, may be required to implement a methodology in accordance with the subject aspects. Moreover, it will be appreciated that the exemplary method and other methods according to the described aspects may be implemented in association with the method illustrated and described herein, as well as in association with other systems and apparatus not illustrated or described.

Figure 8:
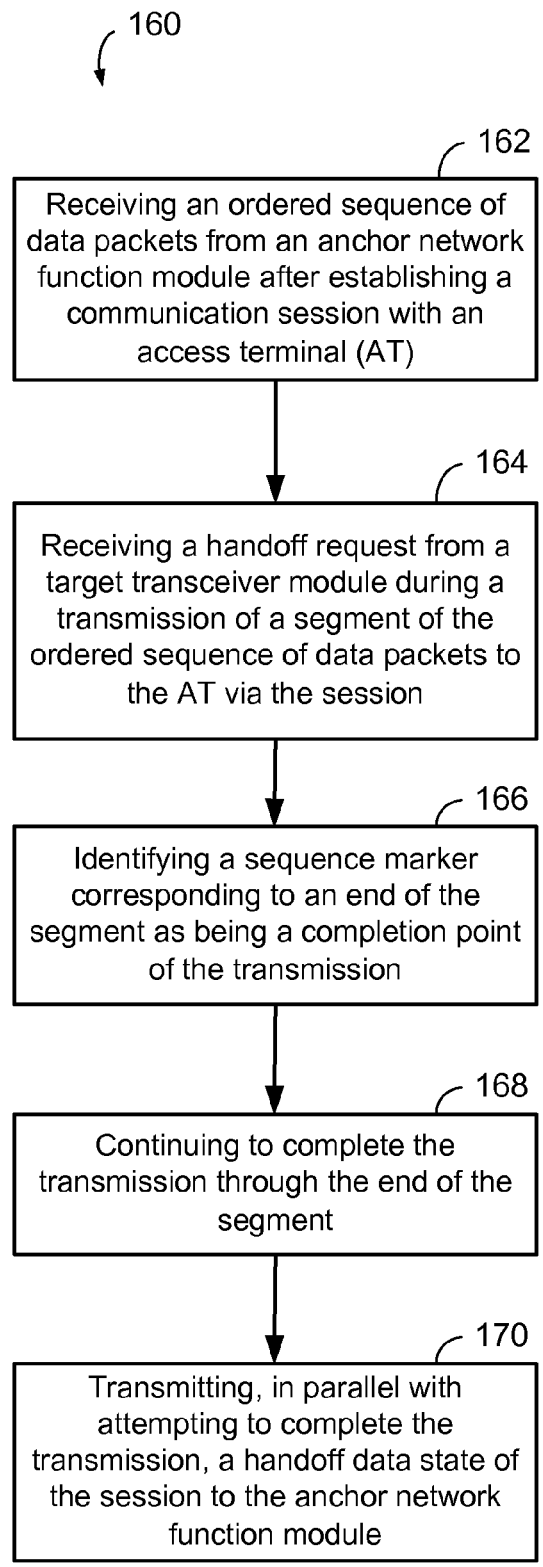
FIG. 8 is a flow diagram of one aspect of a method of an source access point of FIG. 1.

In operation, referring to FIG. 8, in one aspect, a method 160 of performing a session handoff in a wireless communication system comprises receiving an ordered sequence of data packets from an anchor network function module after establishing a communication session with an access terminal. In the case, the communication session is controlled by the anchor network function module, wherein the anchor network function module comprises a shadow buffer operable to store the ordered sequence of data packets (Block 162). For example, the ordered sequence of data packets may be received on the forward link from a network data control function element.

Further, the method includes receiving a handoff request from a target transceiver module during a transmission of a segment of the ordered sequence of data packets to the access terminal via the session (Block 164). For example, the target transceiver module may have received a request from an access terminal to initiate the handoff.

Also, the method includes identifying a sequence marker corresponding to an end of the segment as being a completion point of the transmission (Block 166). For example, the source transceiver module is operable to identify an end of a segment it is currently transmitting, which may be a progressive transmission such as may be found in error correction transmission that allow for repeating of a transmission.

Moreover, the method includes continuing to complete the transmission through the end of the segment (Block 168). As noted, the transmission may be an error correction type transmission, such as a hybrid ARQ transmission.

Additionally, the method includes transmitting, in parallel with continuing to complete the transmission, a handoff data state of the session to the anchor network function module. In this case, the handoff data state comprises an identifier of the target transceiver module and the sequence marker. Further, the handoff data state is operable to trigger the anchor network function module to transmit a portion of the ordered sequence of data packets to the identified target transceiver module from the shadow buffer, wherein the portion begins after the end of the segment identified by the sequence marker (Block 170). For example, the source transceiver module may be operable to forward the handoff data state to a network control function module that operates to switch control over to the target transceiver module such that shadow buffered portions of the transmission subsequent to the end of the segment can be queued up at target transceiver module prior to the handoff. Such preloading of the target transceiver module while allowing the source transceiver module to complete its transmission may be highly efficient, and provide a low latency handoff, especially in a high data rate network.

Figure 9:
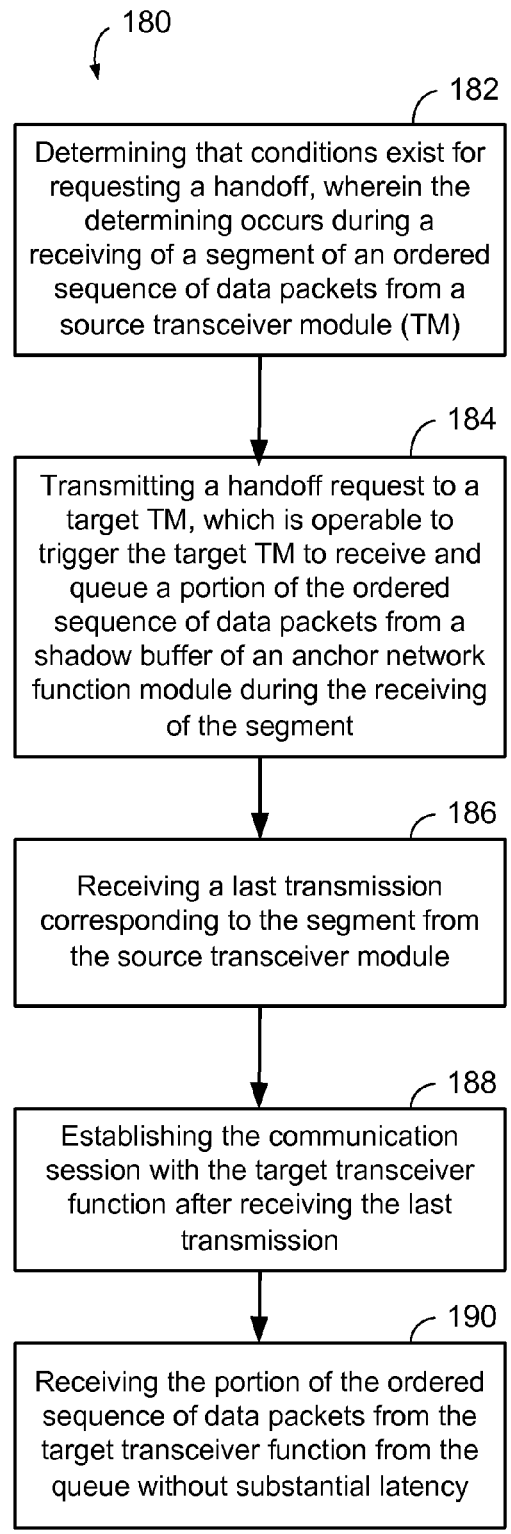
FIG. 9 is a flow diagram of one aspect of a method of an access terminal of FIG. 1.

Referring to FIG. 9, in another aspect, a method 180 of performing a session handoff in a wireless communication system comprises determining that conditions exist for requesting a handoff of an established communication session from the source transceiver module to a target transceiver module, wherein the determining occurs during a receiving of a segment of an ordered sequence of data packets from a source transceiver module (Block 182). For example, an access terminal may include logic operable to detect a handoff condition based on received pilot signal strengths of adjacent access points.

The method further includes transmitting a handoff request to the target transceiver module based on the determining, wherein the handoff request is operable to trigger the target transceiver module to receive and queue a portion of the ordered sequence of data packets from a shadow buffer of an anchor network function module during the receiving of the segment, wherein the portion corresponds to a part of the ordered sequence following the segment (Block 184). For example, the sending of the handoff request by the access terminal causes a series of actions whereby the source transceiver module is notified of the handover request and provides state information prior to the handoff to allow target transceiver module to build up a queue of data packets beyond the end of the segment currently being transmitted by the source transceiver function.

Also, the method includes receiving a last transmission corresponding to the segment from the source transceiver module (Block 186). For example, the transmission may be an error correction transmission that includes a give number of retransmissions. Rather than waste the time spent in performing error correcting functions, as would occur if the handoff were immediately effected, the present aspects take advantage of the time to complete the transmission by priming the target transceiver with data so that the handoff has reduced latency.

Further, the method includes establishing the communication session with the target transceiver function after receiving the last transmission from the source transceiver module (Block 188). For example, the communication session of the access terminal is handed off to the target transceiver module once the last transmission is completed.

Additionally, the method includes receiving the portion of the ordered sequence of data packets from the target transceiver function, under a control of the anchor network function module, from the queue without substantial latency after establishing the communication session with the target transceiver function (Block 190). As noted above, the anchor network function has previously started to load the target transceiver module with any ordered data after the end of the identified segment. As such, the target transceiver module achieves a highly efficient, low-latency handoff, especially in high data rate system where large queues could otherwise build up and require expensive usage of backhaul networks.

Figure 10:
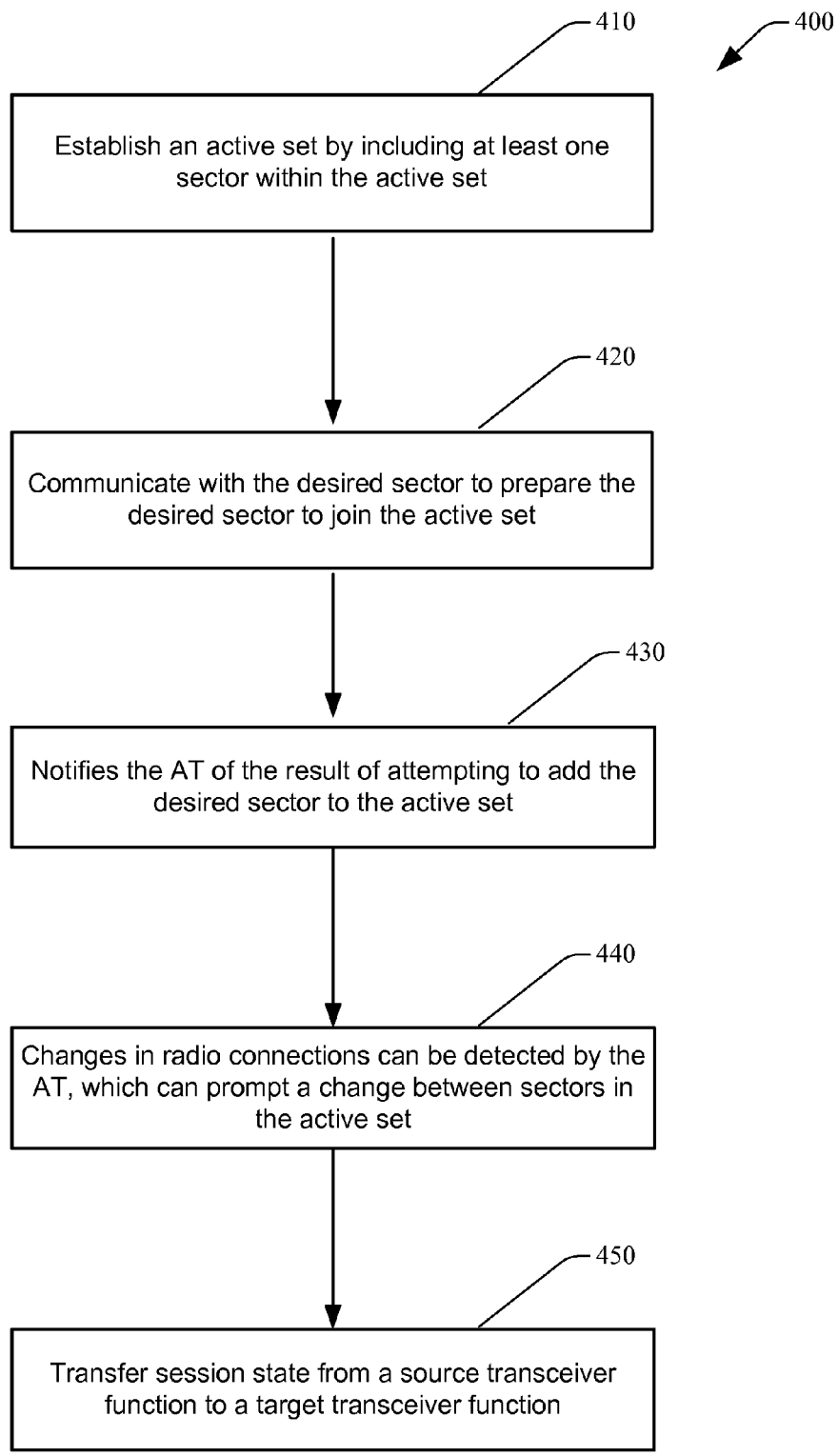
FIG. 10 is a flow diagram of one aspect of a method of transferring a state from a source transceiver to a target transceiver.

FIG. 10 illustrates a related methodology of transferring a state from a source transceiver to a target transceiver according to an aspect. At 410, an AT establishes an active set by including at least one sector within the active set. Further, as part of the establishing of the active set, AT communicates the desire to include the at least one sector in the active set to the AP. At 420, the AP communicates with the desired sector to prepare the desired sector to join the active set. In particular, if the desired sector agrees to join the active set, the desired sector allocates resources to prepare for communication with the AT. On the other hand, the desired AT may not respond or may deny the request. In either case, at 430, AP notifies the AT of the result of attempting to add the desired sector to the active set. Then, at 440, changes in radio connections can be detected by the AT, which can prompt a change between sectors in the active set. For example, a handoff can occur in Layer 2, also known as the data/radio link layer of a multilayer protocol, as described above. Thus, at 450, a session state is then transferred from a source transceiver function to a target transceiver function. Since the sectors in the active set are prepared to receive a handover of a communication session including the AT, the TF transfer (e.g., for radio link protocol in transceiver function) is performed seamlessly, with substantially low latency and quickly (e.g., in a range of 20-40 milliseconds).

As used in herein, the terms "component," "system" and the like are intended to refer to a computer-related entity, either hardware, a combination of hardware and software, software or software in execution and/or electromechanical units. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the described aspects or portion thereof in any manner. It is to be appreciated that a myriad of additional or alternate examples could have been presented, but have been omitted for purposes of brevity.

Furthermore, all or portions of the described aspects may be implemented as a system, method, apparatus, or article of manufacture using standard programming and/or engineering techniques to produce software, firmware, hardware or any combination thereof to control a computer to implement the disclosed aspects. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of performing a session handoff in a wireless communication system, comprising:
    receiving by a source transceiver module an ordered sequence of data packets from an anchor network function module after establishing a communication session with an access terminal, wherein the communication session is controlled by the anchor network function module, and the anchor network function module comprises a shadow buffer operable to store a copy of the ordered sequence of data packets transmitted to the source transceiver module;
    transmitting, in a transmission, a segment of the ordered sequence of data packets to the access terminal via the communication session;
    identifying a sequence marker corresponding to an end of the segment as being a completion point of the transmission;
    continuing to complete the transmission through the end of the segment; and
    transmitting, in parallel with continuing to complete the transmission, a handoff data state of the communication session to the anchor network function module, wherein the handoff data state comprises an identifier of a target transceiver module and the sequence marker, the handoff data state is operable to trigger the anchor network function module to transmit a portion of the copy of the ordered sequence of data packets to the identified target transceiver module from the shadow buffer prior to completion of handoff, and the portion begins after the end of the segment identified by the sequence marker.

2. The method of claim 1, wherein continuing to complete the transmission further comprises transmitting error correction messages.

3. The method of claim 1, wherein continuing to complete the transmission further comprises transmitting hybrid Automatic Repeat-reQuest (HARQ) messages.

4. The method of claim 1, wherein the handoff occurs with the anchor network function module maintaining a control over the communication session.

5. The method of claim 1, wherein the transmission comprises a data rate of greater than 1 Mbits/second.

6. The method of claim 1, further comprising transmitting a handoff response message to the target transceiver module, wherein the handoff response message includes final state information, and transmits a handoff transfer message to a network control function portion of the anchor network function module to complete the handoff, wherein the anchor control function portion maintains a control of the communication session.

7. At least one processor operable to perform a session handoff in a wireless communication system, comprising:
    a first module in a source transceiver module for receiving an ordered sequence of data packets from an anchor network function module after establishing a communication session with an access terminal, wherein the communication session is controlled by the anchor network function module, and the anchor network function module comprises a shadow buffer operable to store a copy of the ordered sequence of data packets transmitted to the source transceiver module;

a second module for transmitting, in a transmission, a segment of the ordered sequence of data packets to the access terminal via the communication session;

a third module for identifying a sequence marker corresponding to an end of the segment as being a completion point of the transmission;

a fourth module for continuing to complete the transmission through the end of the segment; and a fifth module for transmitting, in parallel with continuing to complete the transmission, a handoff data state of the communication session to the anchor network function module, wherein the handoff data state comprises an identifier of a target transceiver module and the sequence marker, the handoff data state is operable to trigger the anchor network function module to transmit a portion of the copy of the ordered sequence of data packets to the identified target transceiver module from the shadow buffer prior to completion of handoff, and the portion begins after the end of the segment identified by the sequence marker.

8. A computer program product for performing a session handoff in a wireless communication system, comprising:

a non-transitory computer readable medium, comprising:
at least one instruction for causing a source transceiver module to receive an ordered sequence of data packets from an anchor network function module after establishing a communication session with an access terminal, wherein the communication session is controlled by the anchor network function module, and the anchor network function module comprises a shadow buffer operable to store a copy of the ordered sequence of data packets transmitted to the source transceiver module;
at least one instruction for transmitting, in a transmission, a segment of the ordered sequence of data packets to the access terminal via the communication session;
at least one instruction for identifying a sequence marker corresponding to an end of the segment as being a completion point of the transmission;
at least one instruction for continuing to complete the transmission through the end of the segment; and
at least one instruction for transmitting, in parallel with continuing to complete the transmission, a handoff data state of the communication session to the anchor network function module, wherein the handoff data state comprises an identifier of a target transceiver module and the sequence marker, the handoff data state is operable to trigger the anchor network function module to transmit a portion of the copy of the ordered sequence of data packets to the identified target transceiver module from the shadow buffer prior to completion of handoff, and the portion begins after the end of the segment identified by the sequence marker.

9. An access point, comprising:
means for receiving by a source transceiver module an ordered sequence of data packets from an anchor network function module after establishing a communication session with an access terminal, wherein the communication session is controlled by the anchor network function module, and the anchor network function module comprises a shadow buffer operable to store a copy of the ordered sequence of data packets transmitted to the source transceiver module;

means for transmitting, in a transmission, a segment of the ordered sequence of data packets to the access terminal via the communication session;

means for identifying a sequence marker corresponding to an end of the segment as being a completion point of the transmission;

means for continuing to complete the transmission through the end of the segment; and means for transmitting, in parallel with continuing to complete the transmission, a handoff data state of the communication session to the anchor network function module, wherein the handoff data state comprises an identifier of a target transceiver module and the sequence marker, the handoff data state is operable to trigger the anchor network function module to transmit a portion of the copy of the ordered sequence of data packets to the identified target transceiver module from the shadow buffer prior to completion of handoff, and the portion begins after the end of the segment identified by the sequence marker.

10. An access point, comprising:
a memory comprising a handoff manager module having sequence determination logic;
a processor in communication with the memory and operable to execute the handoff manager module; and
a source transceiver module operable to:
receive an ordered sequence of data packets from an anchor network function module after establishing a communication session with an access terminal, wherein the communication session is controlled by the anchor network function module, and the anchor network function module comprises a shadow buffer operable to store a copy of the ordered sequence of data packets transmitted to the source transceiver module;
transmit, in a transmission, a segment of the ordered sequence of data packets to the access terminal via the communication session, wherein the sequence determination logic is operable to identify a sequence marker corresponding to an end of the segment as being a completion point of the transmission;
continue to complete the transmission through the end of the segment; and
continue to transmit, in parallel with continuing to complete the transmission, a handoff data state of the communication session to the anchor network function module, wherein the handoff data state comprises an identifier of a target transceiver module and the sequence marker, the handoff data state is operable to trigger the anchor network function module to transmit a portion of the copy of the ordered sequence of data packets to the identified target transceiver module from the shadow buffer prior to completion of handoff, and the portion begins after the end of the segment identified by the sequence marker.

11. The access point of claim 10, wherein the transmission further comprises error correction messages.

12. The access point of claim 10, wherein the transmission further comprises hybrid Automatic Repeat-reQuest (HARQ) messages.

13. The access point of claim 10, wherein the handoff occurs with the anchor network function module maintaining a control over the communication session.

14. The access point of claim 10, wherein the transmission comprises a data rate of greater than 1 Mbits/second.

15. The access point of claim 10, wherein the source transceiver module is operable to transmit a handoff response message to the target transceiver module, wherein the handoff response message includes final state information, and transmits a handoff transfer message to a network control function portion of the anchor network function module to complete the handoff, wherein the anchor control function portion maintains a control of the communication session.

16. A method of performing a session handoff in a wireless communication system, comprising:
    determining that conditions exist for requesting a handoff of an established communication session from a source transceiver module to a target transceiver module upon receiving a segment of an ordered sequence of data packets from the source transceiver module;
    transmitting a handoff request based on the determining, wherein the handoff request is operable to cause the source transceiver module to identify a sequence marker corresponding to an end of the segment of the ordered sequence of data packets being transmitted to the access terminal, to transmit to an anchor network function module an identifier of the target transceiver module and the sequence marker, and to trigger the anchor network function module to transmit a portion of a copy of the ordered sequence of data packets to the identified target transceiver module prior to completion of handoff, wherein the portion begins after the end of the segment identified by the sequence marker;
    receiving a last transmission corresponding to the segment from the source transceiver module;
    establishing the communication session with a target transceiver function after receiving the last transmission from the source transceiver module; and
    receiving the copy of the portion of the ordered sequence of data packets from the target transceiver function, under a control of the anchor network function module, without substantial latency after establishing the communication session with the target transceiver function.

17. The method of claim 16, wherein the receiving of the segment further comprises receiving an error correction message.

18. The method of claim 16, wherein the receiving of the segment further comprises receiving a hybrid Automatic Repeat-reQuest (HARQ) message.

19. The method of claim 16, wherein the handoff occurs with the anchor network function module maintaining a control over the communication session.

20. The method of claim 16, wherein the last transmission comprises a data rate of greater than 1 Mbits/second.

21. At least one processor for performing a session handoff in a wireless communication system, comprising:
    a first module for determining that conditions exist for requesting a handoff of an established communication session from a source transceiver module to a target transceiver module upon receiving a segment of an ordered sequence of data packets from the source transceiver module;
    a second module for transmitting a handoff request based on the determining, wherein the handoff request is operable to cause the source transceiver module to identify a sequence marker corresponding to an end of the segment of the ordered sequence of data packets being transmitted to the access terminal, to transmit to an anchor network function module an identifier of the target transceiver module and the sequence marker, and to trigger the anchor network function module to transmit a portion of a copy of the ordered sequence of data packets to the identified target transceiver module prior to completion of handoff, wherein the portion begins after the end of the segment identified by the sequence marker;
    a third module for receiving a last transmission corresponding to the segment from the source transceiver module; and
    a fourth module for establishing the communication session with a target transceiver function after receiving the last transmission from the source transceiver module,
    wherein the third module further receives the copy of the portion of the ordered sequence of data packets from the target transceiver function, under a control of the anchor network function module, without substantial latency after establishing the communication session with the target transceiver function.

22. A computer program product for performing a session handoff in a wireless communication system, comprising:
    a non-transitory computer readable medium, comprising:
        at least one instruction for causing a computer to determine that conditions exist for requesting a handoff of an established communication session from a source transceiver module to a target transceiver module upon receiving a segment of an ordered sequence of data packets from the source transceiver module;
        at least one instruction for causing the computer to transmit a handoff request based on the determining, wherein the handoff request is operable to cause the source transceiver module to identify a sequence marker corresponding to an end of the segment of the ordered sequence of data packets being transmitted to the access terminal, to transmit to an anchor network function module an identifier of the target transceiver module and the sequence marker, and to trigger the anchor network function module to transmit a portion of a copy of the ordered sequence of data packets to the identified target transceiver module prior to completion of handoff, wherein the portion begins after the end of the segment identified by the sequence marker;
    at least one instruction for causing the computer to receive a last transmission corresponding to the segment from the source transceiver module;
    at least one instruction for causing the computer to establish the communication session with a target transceiver function after receiving the last transmission from the source transceiver module; and
    at least one instruction for causing the computer to receive the copy of the portion of the ordered sequence of data packets from the target transceiver function, under a control of the anchor network function module, without substantial latency after establishing the communication session with the target transceiver function.

23. An access terminal, comprising:
    means for determining that conditions exist for requesting a handoff of an established communication session from a source transceiver module to a target transceiver module upon receiving a segment of an ordered sequence of data packets from the source transceiver module;
    means for transmitting a handoff request based on the determining, wherein the handoff request is operable to cause the source transceiver module to identify a sequence marker corresponding to an end of the segment of the ordered sequence of data packets being transmitted to the access terminal, to transmit to an anchor network function module an identifier of the target transceiver module and the sequence marker, and to trigger the anchor network function module to transmit a portion of a copy of the ordered sequence of data packets to the identified target transceiver module prior to completion of handoff, wherein the portion begins after the end of the segment identified by the sequence marker;
    means for receiving a last transmission corresponding to the segment from the source transceiver module;

means for establishing the communication session with a target transceiver function after receiving the last transmission from the source transceiver module; and means for receiving the copy of the portion of the ordered sequence of data packets from the target transceiver function, under a control of the anchor network function module, without substantial latency after establishing the communication session with the target transceiver function.

24. An access terminal, comprising:

a memory comprising a handoff manager module having handoff determination logic and handoff requestor logic;

a processor in communication with the memory and operable to execute the handoff manager module, wherein the handoff determination logic is operable to determine that conditions exist for requesting a handoff of an established communication session from a source transceiver module to a target transceiver module upon receiving a segment of an ordered sequence of data packets from the source transceiver module, wherein the handoff requestor logic is operable to transmit a handoff request based on the determining, and the handoff request is operable to cause the source transceiver module to identify a sequence marker corresponding to an end of the segment of the ordered sequence of data packets being transmitted to the access terminal, to transmit to an anchor network function module an identifier of the target transceiver module and the sequence marker, and to trigger the anchor network function module to transmit a portion of a copy of the ordered sequence of data packets to the identified target transceiver module prior to completion of handoff, wherein the portion begins after the end of the segment identified by the sequence marker; and a communications module in communication with memory and the processor and operable to receive a last transmission corresponding to the segment from the source transceiver module, wherein the handoff manager module is operable to establish the communication session with a target transceiver function after receiving the last transmission from the source transceiver module, and wherein the communications module is further operable to receive the copy of the portion of the ordered sequence of data packets from the target transceiver function, under a control of the anchor network function module, without substantial latency after establishing the communication session with the target transceiver function.

25. The access terminal of claim 24, wherein the segment further comprises an error correction message.

26. The access terminal of claim 24, wherein the segment further comprises a hybrid Automatic Repeat-reQuest (HARQ) message.

27. The access terminal of claim 24, wherein the handoff occurs with the anchor network function module maintaining a control over the communication session.

28. The access terminal of claim 24, wherein the transmission comprises a data rate of greater than 1 Mbits/second.

29. A method of performing a session handoff by a network-side system of a wireless communication system, comprising:

controlling, by an anchor network function module, a communication session of an access terminal with a source transceiver module;

transmitting to the source transceiver module an ordered sequence of data packets destined for the access terminal;

copying the ordered sequence of data packets into a shadow buffer operable to store the ordered sequence of data packets;

receiving a handoff data state from the source transceiver module in parallel with the source transceiver module continuing to complete a transmission of a segment of the ordered sequence of data packets to the access terminal, wherein the handoff data state is based on the source transceiver module receiving a handoff request from a during the transmission of the segment of the ordered sequence of data packets to the access terminal via the communication session, identifying a sequence marker corresponding to an end of the segment as being a completion point of the transmission, and continuing to complete the transmission through the end of the segment, wherein the handoff data state comprises an identifier of the target transceiver module and the sequence marker; and transmitting, by an anchor network function module and in response to receiving the handoff data state and prior to completion of a handoff, a portion of the copy of the ordered sequence of data packets to the identified target transceiver module from the shadow buffer, wherein the portion begins after the end of the segment identified by the sequence marker.

30. The method of claim 29, wherein the sequence marker enables tracking of partial data packets.

31. A system for performing a session handoff of a wireless communication system, comprising:

an anchor network function module having a corresponding shadow buffer, wherein the anchor network function module is operable to:

control a communication session of an access terminal with a source transceiver module, transmit to the source transceiver module an ordered sequence of data packets destined for the access terminal, copy the ordered sequence of data packets into the shadow buffer, which is operable to store the ordered sequence of data packets, receive a handoff data state from the source transceiver module in parallel with the source transceiver module continuing to complete a transmission of a segment of the ordered sequence of data packets to the access terminal, wherein the handoff data state is based on the source transceiver module receiving a handoff request during the transmission of the segment of the ordered sequence of data packets to the access terminal via the communication session, and identifying a sequence marker corresponding to an end of the segment as being a completion point of the transmission, wherein the handoff data state comprises an identifier of the target transceiver module and the sequence marker, and transmit a portion of the copy of the ordered sequence of data packets to the identified target transceiver module from the shadow buffer in response to receiving the handoff data state and prior to completion of a handoff, wherein the portion begins after the end of the segment identified by the sequence marker.

32. The system of claim 31, wherein the sequence marker enables tracking of partial data packets.

33. The method of claim 1, further comprising: receiving a handoff request from the target transceiver module during the transmission of a segment of the ordered sequence of data packets to the access terminal via the communication session.

34. The access point of claim 10, wherein the source transceiver module is operable to receive a handoff request from the target transceiver module during a transmission of a segment of the ordered sequence of data packets to the access terminal via the communication session.

* * * * *